(12) United States Patent
Eliaz

(10) Patent No.: US 9,130,627 B2
(45) Date of Patent: Sep. 8, 2015

(54) MULTI-MODE RECEIVER FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/492,133

(22) Filed: Sep. 22, 2014

(65) Prior Publication Data

US 2015/0071389 A1    Mar. 12, 2015

Related U.S. Application Data

(63) Continuation of application No. 13/756,010, filed on Jan. 31, 2013, now Pat. No. 8,842,778.

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H03K 9/00* (2006.01)
*H04L 27/00* (2006.01)
(Continued)

(52) U.S. Cl.
CPC .............. *H04B 1/0475* (2013.01); *G06F 11/10* (2013.01); *H04B 1/10* (2013.01); *H04B 1/16* (2013.01); *H04B 1/709* (2013.01); *H04B 17/008* (2013.01); *H04L 1/005* (2013.01); *H04L 1/0054* (2013.01); *H04L 1/206* (2013.01); *H04L 7/0087* (2013.01); *H04L 23/02* (2013.01);
(Continued)

(58) Field of Classification Search
CPC ..... H04B 1/10; H04L 23/02; H04L 25/03178
USPC .......... 375/229, 230, 231, 232, 233, 234, 316
See application file for complete search history.

(56) References Cited

U.S. PATENT DOCUMENTS 4,109,101 A    8/1978 Mitani
4,135,057 A *  1/1979 Bayless et al. ................ 375/280
(Continued)

FOREIGN PATENT DOCUMENTS

WO    2013030815 A1    3/2013

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Freshteh N Aghdam
(74) *Attorney, Agent, or Firm* — McAndrews, Held & Malloy, Ltd.

(57) ABSTRACT

A receiver may be dynamically configurable, during runtime, into a plurality of modes of operation. In a first mode of operation the receiver may demodulate received signals having relative low inter-symbol correlation using a near zero ISI filter and symbol slicing. In a second mode of operation the receiver may demodulate received signals having relatively high inter-symbol correlation using an input filter configured to achieve a desired total partial response and a sequence estimation algorithm.

25 Claims, 17 Drawing Sheets

(51) Int. Cl.

| | | |
|---|---|---|
| *H04B 1/04* | (2006.01) | |
| *H04B 1/10* | (2006.01) | |
| *H04L 23/02* | (2006.01) | |
| *H04L 27/04* | (2006.01) | |
| *H04L 27/02* | (2006.01) | |
| *H04L 25/03* | (2006.01) | |
| *H04L 27/01* | (2006.01) | |
| *H04L 27/36* | (2006.01) | |
| *H04L 7/00* | (2006.01) | |
| *G06F 11/10* | (2006.01) | |
| *H04B 1/16* | (2006.01) | |
| *H04L 1/20* | (2006.01) | |
| *H04B 1/709* | (2011.01) | |
| *H04L 25/08* | (2006.01) | |
| *H04L 1/00* | (2006.01) | |
| *H04L 25/02* | (2006.01) | |
| *H04L 27/38* | (2006.01) | |
| *H04B 17/00* | (2015.01) | |

(52) U.S. Cl.
CPC ..... *H04L 25/0236* (2013.01); *H04L 25/03006* (2013.01); *H04L 25/03038* (2013.01); *H04L 25/03057* (2013.01); *H04L 25/03178* (2013.01); *H04L 25/03197* (2013.01); *H04L 25/03267* (2013.01); *H04L 25/03305* (2013.01); *H04L 25/03318* (2013.01); *H04L 25/03337* (2013.01); *H04L 25/03343* (2013.01); *H04L 25/03834* (2013.01); *H04L 25/03949* (2013.01); *H04L 25/08* (2013.01); *H04L 27/00* (2013.01); *H04L 27/01* (2013.01); *H04L 27/02* (2013.01); *H04L 27/04* (2013.01); *H04L 27/36* (2013.01); *H04L 27/366* (2013.01); *H04L 27/38* (2013.01); *H04B 2001/0416* (2013.01)

(56) References Cited

U.S. PATENT DOCUMENTS

| | | | |
|---|---|---|---|
| 4,797,925 | A | 1/1989 | Lin |
| 5,111,484 | A | 5/1992 | Karabinis |
| 5,131,011 | A | 7/1992 | Bergmans et al. |
| 5,202,903 | A | 4/1993 | Okanoue |
| 5,249,200 | A | 9/1993 | Chen et al. |
| 5,283,813 | A | 2/1994 | Shalvi et al. |
| 5,291,516 | A | 3/1994 | Dixon et al. |
| 5,394,439 | A | 2/1995 | Hemmati |
| 5,432,822 | A | 7/1995 | Kaewell, Jr. |
| 5,459,762 | A | 10/1995 | Wang et al. |
| 5,590,121 | A | 12/1996 | Geigel et al. |
| 5,602,507 | A | 2/1997 | Suzuki |
| 5,757,855 | A | 5/1998 | Strolle et al. |
| 5,784,415 | A | 7/1998 | Chevillat et al. |
| 5,818,653 | A | 10/1998 | Park et al. |
| 5,886,748 | A | 3/1999 | Lee |
| 5,889,823 | A | 3/1999 | Agazzi et al. |
| 5,915,213 | A | 6/1999 | Iwatsuki et al. |
| 5,930,309 | A | 7/1999 | Knutson et al. |
| 6,009,120 | A | 12/1999 | Nobakht |
| 6,167,079 | A | 12/2000 | Kinnunen et al. |
| 6,233,709 | B1 | 5/2001 | Zhang et al. |
| 6,272,173 | B1 | 8/2001 | Hatamian |
| 6,335,954 | B1 | 1/2002 | Bottomley et al. |
| 6,356,586 | B1 | 3/2002 | Krishnamoorthy et al. |
| 6,516,437 | B1 | 2/2003 | Van Stralen et al. |
| 6,532,256 | B2 | 3/2003 | Miller |
| 6,535,549 | B1 | 3/2003 | Scott et al. |
| 6,690,754 | B1 | 2/2004 | Haratsch et al. |
| 6,697,441 | B1 | 2/2004 | Bottomley et al. |
| 6,785,342 | B1 | 8/2004 | Isaksen et al. |
| 6,871,208 | B1 | 3/2005 | Guo et al. |
| 6,968,021 | B1 | 11/2005 | White et al. |
| 6,985,709 | B2 | 1/2006 | Perets |
| 7,158,324 | B2 | 1/2007 | Stein et al. |
| 7,190,288 | B2 | 3/2007 | Robinson et al. |
| 7,190,721 | B2 | 3/2007 | Garrett |
| 7,205,798 | B1 | 4/2007 | Agarwal et al. |
| 7,206,363 | B2 | 4/2007 | Hegde et al. |
| 7,215,716 | B1 | 5/2007 | Smith |
| 7,269,205 | B2 | 9/2007 | Wang |
| 7,467,338 | B2 | 12/2008 | Saul |
| 7,830,854 | B1 | 11/2010 | Sarkar et al. |
| 7,974,230 | B1 | 7/2011 | Talley et al. |
| 8,005,170 | B2 | 8/2011 | Lee et al. |
| 8,059,737 | B2 | 11/2011 | Yang |
| 8,175,186 | B1 | 5/2012 | Wiss et al. |
| 8,199,804 | B1 | 6/2012 | Cheong |
| 8,248,975 | B2 | 8/2012 | Fujita et al. |
| 8,351,536 | B2 | 1/2013 | Mazet et al. |
| 8,422,589 | B2 | 4/2013 | Golitschek Edler Von Elbwart et al. |
| 8,526,523 | B1 | 9/2013 | Eliaz |
| 8,548,072 | B1 | 10/2013 | Eliaz |
| 8,548,089 | B2 | 10/2013 | Agazzi et al. |
| 8,548,097 | B1 | 10/2013 | Eliaz |
| 8,553,821 | B1 | 10/2013 | Eliaz |
| 8,559,494 | B1 | 10/2013 | Eliaz |
| 8,559,496 | B1 | 10/2013 | Eliaz |
| 8,559,498 | B1 | 10/2013 | Eliaz |
| 8,565,363 | B1 | 10/2013 | Eliaz |
| 8,566,687 | B1 | 10/2013 | Eliaz |
| 8,571,131 | B1 | 10/2013 | Eliaz |
| 8,571,146 | B1 | 10/2013 | Eliaz |
| 8,572,458 | B1 | 10/2013 | Eliaz |
| 8,582,637 | B1 | 11/2013 | Eliaz |
| 8,599,914 | B1 | 12/2013 | Eliaz |
| 8,605,832 | B1 | 12/2013 | Eliaz |
| 8,665,941 | B1 | 3/2014 | Eliaz |
| 8,665,992 | B1 | 3/2014 | Eliaz |
| 8,666,000 | B2 | 3/2014 | Eliaz |
| 8,675,769 | B1 | 3/2014 | Eliaz |
| 8,675,782 | B2 | 3/2014 | Eliaz |
| 8,681,889 | B2 | 3/2014 | Eliaz |
| 8,737,458 | B2 | 5/2014 | Eliaz |
| 8,744,003 | B2 | 6/2014 | Eliaz |
| 8,781,008 | B2 | 7/2014 | Eliaz |
| 8,804,879 | B1 | 8/2014 | Eliaz |
| 8,811,548 | B2 | 8/2014 | Eliaz |
| 8,824,572 | B2 | 9/2014 | Eliaz |
| 8,824,599 | B1 | 9/2014 | Eliaz |
| 8,824,611 | B2 | 9/2014 | Eliaz |
| 8,831,124 | B2 | 9/2014 | Eliaz |
| 8,842,778 | B2 | 9/2014 | Eliaz |
| 8,873,612 | B1 | 10/2014 | Eliaz |
| 8,885,698 | B2 | 11/2014 | Eliaz |
| 8,885,786 | B2 | 11/2014 | Eliaz |
| 8,891,701 | B1 | 11/2014 | Eliaz |
| 8,897,387 | B1 | 11/2014 | Eliaz |
| 8,897,405 | B2 | 11/2014 | Eliaz |
| 2001/0008542 | A1* | 7/2001 | Wiebke et al. ............. 375/141 |
| 2002/0016938 | A1 | 2/2002 | Starr |
| 2002/0123318 | A1 | 9/2002 | Lagarrigue |
| 2002/0150065 | A1 | 10/2002 | Ponnekanti |
| 2002/0150184 | A1 | 10/2002 | Hafeez et al. |
| 2002/0172297 | A1* | 11/2002 | Ouchi et al. ............. 375/316 |
| 2003/0016741 | A1 | 1/2003 | Sasson et al. |
| 2003/0135809 | A1 | 7/2003 | Kim |
| 2003/0210352 | A1 | 11/2003 | Fitzsimmons et al. |
| 2004/0037374 | A1* | 2/2004 | Gonikberg ............. 375/341 |
| 2004/0086276 | A1 | 5/2004 | Lenosky |
| 2004/0120409 | A1 | 6/2004 | Yasotharan et al. |
| 2004/0142666 | A1 | 7/2004 | Creigh et al. |
| 2004/0170228 | A1 | 9/2004 | Vadde |
| 2004/0174937 | A1* | 9/2004 | Ungerboeck ............. 375/261 |
| 2004/0203458 | A1 | 10/2004 | Nigra |
| 2004/0227570 | A1 | 11/2004 | Jackson et al. |
| 2004/0240578 | A1 | 12/2004 | Thesling |
| 2004/0257955 | A1 | 12/2004 | Yamanaka |
| 2005/0047517 | A1 | 3/2005 | Georgios et al. |
| 2005/0123077 | A1 | 6/2005 | Kim |
| 2005/0135472 | A1 | 6/2005 | Higashino |
| 2005/0163252 | A1 | 7/2005 | McCallister et al. |

(56) References Cited

U.S. PATENT DOCUMENTS

| | | |
|---|---|---|
| 2005/0193318 A1 | 9/2005 | Okumura et al. |
| 2005/0220218 A1 | 10/2005 | Jensen et al. |
| 2005/0265470 A1 | 12/2005 | Kishigami et al. |
| 2005/0276317 A1 | 12/2005 | Jeong et al. |
| 2006/0067396 A1 | 3/2006 | Christensen |
| 2006/0109780 A1 | 5/2006 | Fechtel |
| 2006/0171489 A1 | 8/2006 | Ghosh et al. |
| 2006/0239339 A1 | 10/2006 | Brown et al. |
| 2006/0245765 A1 | 11/2006 | Elahmadi et al. |
| 2006/0280113 A1 | 12/2006 | Huo |
| 2007/0092017 A1 | 4/2007 | Abedi |
| 2007/0098059 A1 | 5/2007 | Ives et al. |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0189404 A1 | 8/2007 | Baum et al. |
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0075590 A1 | 3/2009 | Sahinoglu et al. |
| 2009/0086808 A1 | 4/2009 | Liu et al. |
| 2009/0122854 A1 | 5/2009 | Zhu et al. |
| 2009/0185612 A1 | 7/2009 | Mckown |
| 2009/0213908 A1 | 8/2009 | Bottomley |
| 2009/0245226 A1 | 10/2009 | Robinson et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0115107 A1 | 5/2010 | Mitsuhashi et al. |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0208774 A1 | 8/2010 | Guess et al. |
| 2010/0208832 A1 | 8/2010 | Lee et al. |
| 2010/0220825 A1 | 9/2010 | Dubuc et al. |
| 2010/0278288 A1 | 11/2010 | Panicker et al. |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0069791 A1 | 3/2011 | He |
| 2011/0074500 A1 | 3/2011 | Bouillet et al. |
| 2011/0074506 A1 | 3/2011 | Kleider et al. |
| 2011/0075745 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0170630 A1 | 7/2011 | Silverman et al. |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0051464 A1 | 3/2012 | Kamuf et al. |
| 2012/0106617 A1 | 5/2012 | Jao et al. |
| 2012/0163489 A1 | 6/2012 | Ramakrishnan |
| 2012/0170674 A1* | 7/2012 | Kim et al. .............. 375/267 |
| 2012/0177138 A1 | 7/2012 | Chrabieh et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0077563 A1 | 3/2013 | Kim et al. |
| 2013/0121257 A1 | 5/2013 | He et al. |
| 2013/0343480 A1 | 12/2013 | Eliaz |
| 2013/0343487 A1 | 12/2013 | Eliaz |
| 2014/0036986 A1 | 2/2014 | Eliaz |
| 2014/0056387 A1 | 2/2014 | Asahina |
| 2014/0098841 A2 | 4/2014 | Song et al. |
| 2014/0098907 A1 | 4/2014 | Eliaz |
| 2014/0098915 A1 | 4/2014 | Eliaz |
| 2014/0105267 A1 | 4/2014 | Eliaz |
| 2014/0105268 A1 | 4/2014 | Eliaz |
| 2014/0105332 A1 | 4/2014 | Eliaz |
| 2014/0105334 A1 | 4/2014 | Eliaz |
| 2014/0108892 A1 | 4/2014 | Eliaz |
| 2014/0133540 A1 | 5/2014 | Eliaz |
| 2014/0140388 A1 | 5/2014 | Eliaz |
| 2014/0140446 A1 | 5/2014 | Eliaz |
| 2014/0146911 A1 | 5/2014 | Eliaz |
| 2014/0161158 A1 | 6/2014 | Eliaz |
| 2014/0161170 A1 | 6/2014 | Eliaz |
| 2014/0198255 A1 | 7/2014 | Kegasawa |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

(56) References Cited

OTHER PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

Stefano Tomasin, et al. "Iterative Interference Cancellation and Channel Estimation for Mobile OFDM", IEEE Transactions on Wireless Communications, Vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

Ai-Dhahir, Naofal et al., "MMSE Decision-Feedback Equalizers: Finite-Length Results" IEEE Transactions on Information Theory, vol. 41, No. 4, Jul. 1995.

Cioffi, John M. et al., "MMSE Decision-Feedback Equalizers and Coding—Park I: Equalization Results" IEEE Transactions on Communications, vol. 43, No. 10, Oct. 1995.

Eyuboglu, M. Vedat et al., "Reduced-State Sequence Estimation with Set Partitioning and Decision Feedback" IEEE Transactions on Communications, vol. 36, No. 1, Jan. 1988.

* cited by examiner

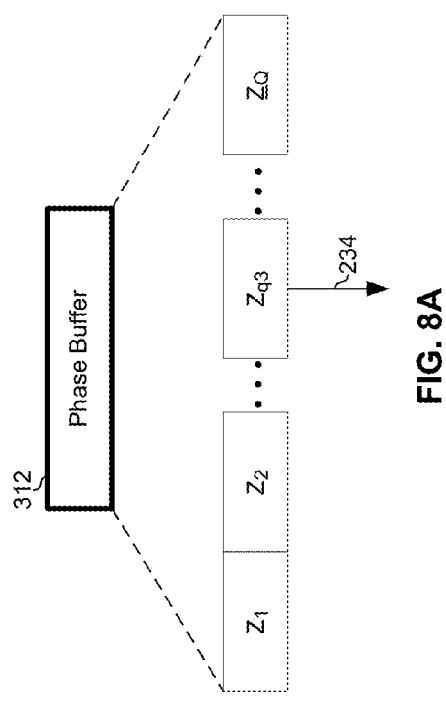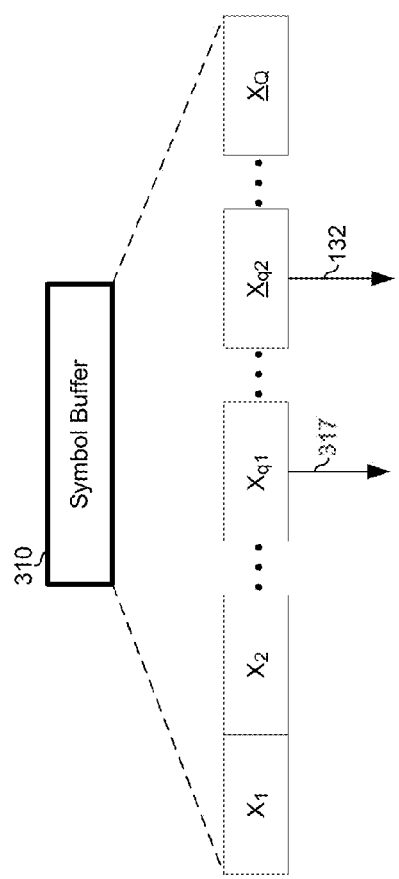

MULTI-MODE RECEIVER FOR HIGHLY-SPECTRALLY-EFFICIENT COMMUNICATIONS

CLAIM OF PRIORITY

This patent application is a continuation of U.S. patent application Ser. No. 13/756,010 filed on Jan. 31, 2013, (now U.S. Pat. No. 8,842,778) which, in turn, claims priority to:

U.S. Provisional Patent Application Ser. No. 61/662,085 entitled "Apparatus and Method for Efficient Utilization of Bandwidth" and filed on Jun. 20, 2012, now expired;

U.S. Provisional Patent Application Ser. No. 61/726,099 entitled "Modulation Scheme Based on Partial Response" and filed on Nov. 14, 2012, now expired;

U.S. Provisional Patent Application Ser. No. 61/729,774 entitled "Modulation Scheme Based on Partial Response" and filed on Nov. 26, 2012, now expired; and U.S. Provisional Patent Application Ser. No. 61/747,132 entitled "Modulation Scheme Based on Partial Response" and filed on Dec. 28, 2012, now expired.

Each of the above-identified applications is hereby incorporated herein by reference in its entirety.

INCORPORATION BY REFERENCE

This patent application also makes reference to:

U.S. Pat. No. 8,582,637, titled "Low-Complexity, Highly-Spectrally-Efficient Communications;" and U.S. Pat. No. 8,744,003, titled "Multi-Mode Transmitter for Highly-Spectrally-Efficient Communications."

Each of the above stated applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for low-complexity, highly-spectrally efficient communications, substantially as illustrated by and/or described in connection with at least one of the figures, as set forth more completely in the claims.

BRIEF DESCRIPTION OF THE DRAWINGS

FIG. 8A depicts an example implementation of the phase buffer shown in FIG. 3.

FIG. 8B depicts an example implementation of the symbol buffer shown in FIG. 3.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1A:
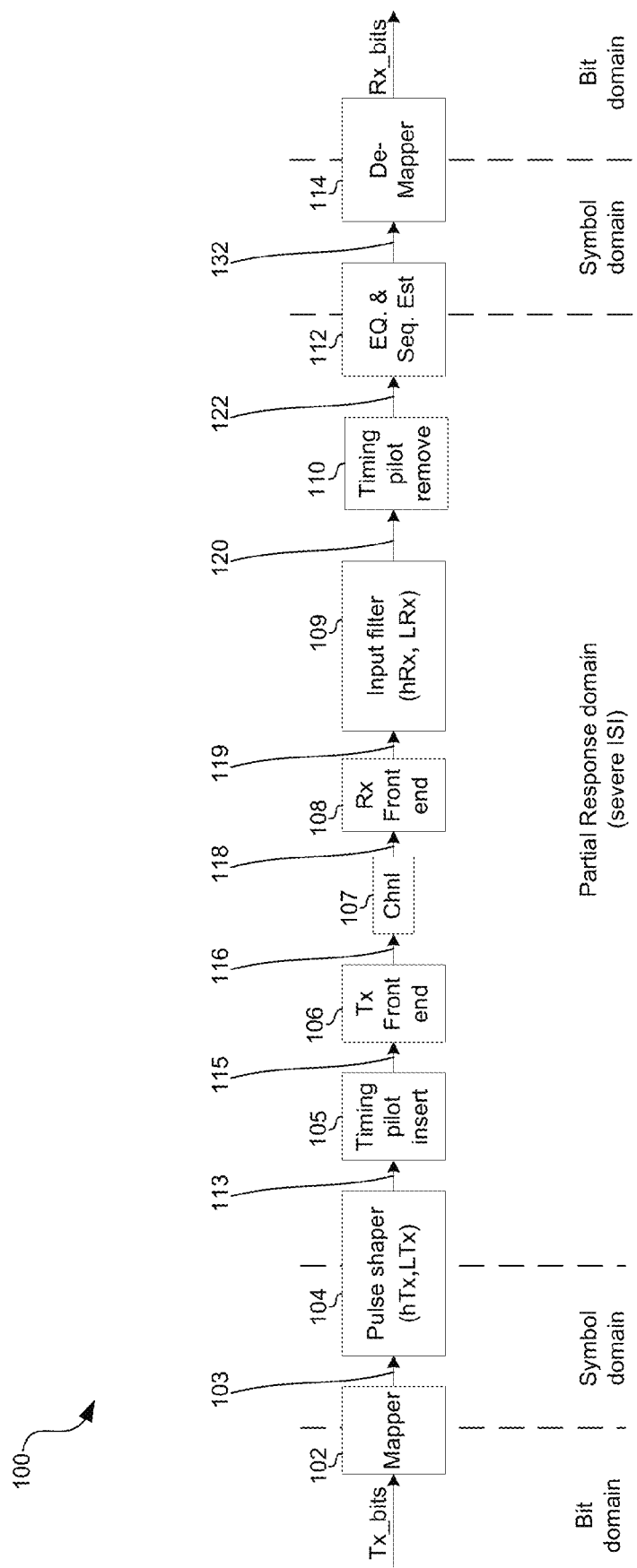
FIG. 1A is a block diagram depicting an example system configured for low-complexity, highly-spectrally-efficient communications.

FIG. 1A is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $\text{Log}_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $\log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) dedecoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 1B:
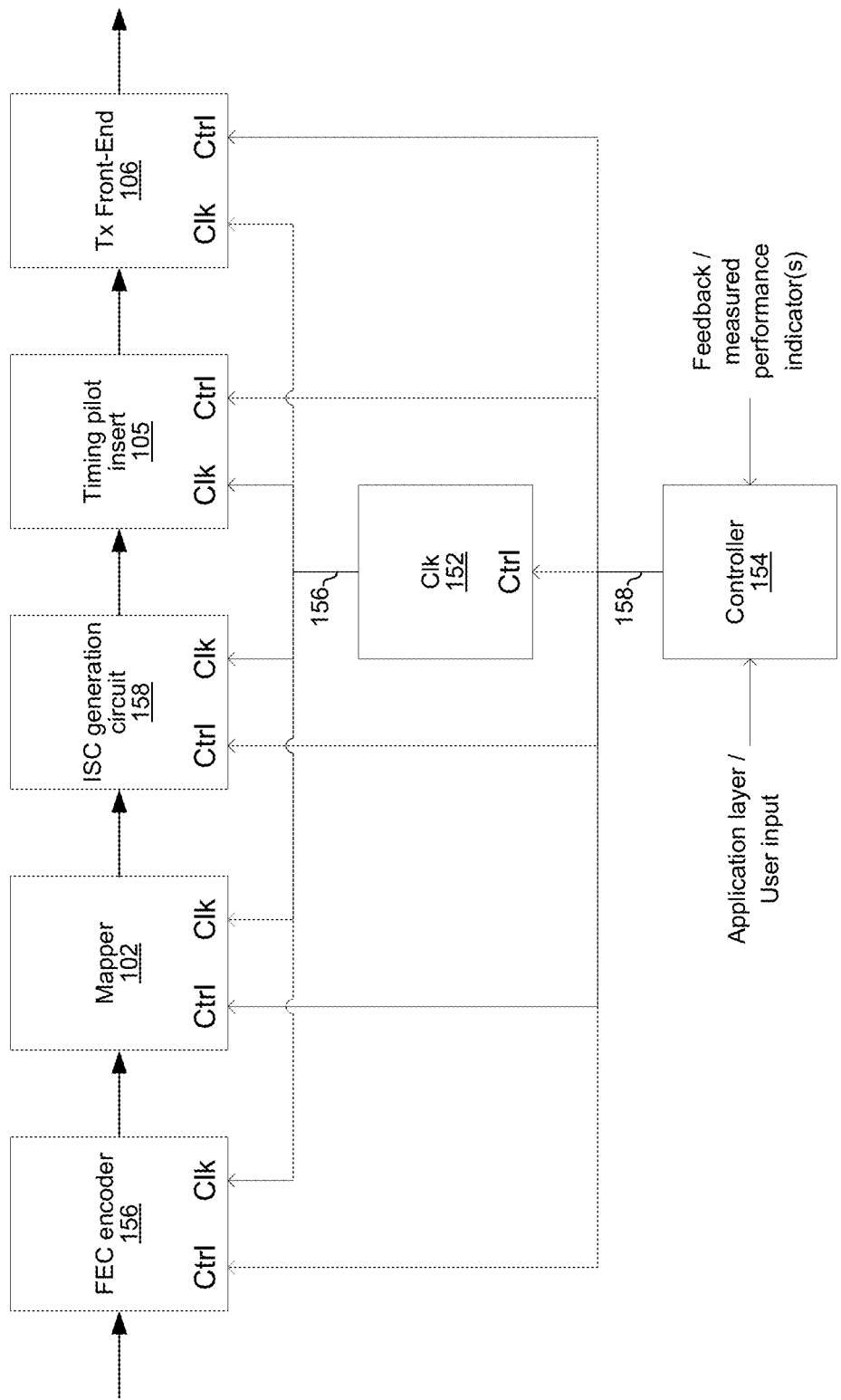
FIG. 1B is a block diagram illustrating a multi-mode transmitter operable to support low-complexity, highly-spectrally-efficient communications.

FIG. 1B is a block diagram illustrating a multi-mode transmitter operable to support low-complexity, highly-spectrally-efficient communications. Shown in FIG. 1B, are a forward error correction (FEC) encoder 156, the mapper 102, an inter-symbol correlation (ISC) generation circuit 158, the timing pilot insertion circuit 105, the transmitter front-end circuit 106, a clock signal generation circuit 152, and a control circuit 154.

The clock signal generation circuit 152 may comprise, for example, one or more oscillators (e.g., a crystal oscillator) and one or more phase locked loops (PLLs) for generating a clock signal 156 whose frequency determines the rate at which symbols are generated and transmitted by the transmitter (the "symbol rate" or "baud rate"). The frequency of the clock signal 156 may be based on the mode of operation of the transmitter (e.g., as indicated by control signal 158).

The control circuit 154 may comprise, for example, an application specific integrated circuit (ASIC), a programmable interrupt controller (PIC), an ARM-based processor, an x86-based processor, and/or any other suitable circuitry operable to control a configuration of the transmitter based on one or more parameters. The parameters on which the configuration of the transmitter may be based may include, for example, input from a user of, and/or software application running on, a device (e.g., a mobile phone, laptop, base station, or the like) in which the transmitter resides. The parameters on which the configuration of the transmitter may be based may include performance indicators measured by circuitry of the transmitter such as, for example, measured noise levels, temperature, battery charge level, etc. The parameters on which the configuration of the transmitter may be based may include, for example, characteristics of data to be transmitted. Such characteristics may include, for example, quality of service parameters (e.g., latency and/or throughput requirements) and/or a model of non-linear distortion that the data will experience en route to a receiver. The parameters on which the configuration of the transmitter may be based may include performance indicators measured by and fed back from a receiver. Such performance indicators may include, for example, symbol error rate (SER), bit error rate (BER), signal-to-noise ratio (SNR), metrics calculated by a sequence estimation circuit, a phase error measured by the receiver, a measurement indicative of multipath present in the channel, and/or any other relevant performance indicator. The control circuit 154 may indicate a mode of operation of the transmitter and/or control configuration of the various components of the transmitter via the control signal 158.

The control circuit 154 may also be operable to generate control messages that indicate a configuration of the transmitter. Such control messages may be, for example, inserted into the transmitted datastream and/or transmitted on a control channel of beacon signal, to inform the receiver of the configuration of the receiver. Such control messages may be used by a multi-mode receiver for configuration of its circuitry.

The FEC encoder 156 may be perform FEC encoding according to one or more algorithms such as Reed-Solomon, or low-density parity check (LDPC) algorithms. The FEC code rate and/or the encoding algorithm used may be determined based on the mode of operation of the transmitter (e.g., as indicated by control signal 158). For example, FEC type (e.g., LDPC, RS, etc.) may be switched to match the modulation type and FEC rate may be optimized to increase capacity based on the mode of operation of the transmitter. In some cases of iterative FEC codes (e.g., LDPC, turbo), the code structure may vary to utilize the statistical characteristics of the partial response signal errors. FEC decoding performance may be improved through dynamic selection of the appropriate error model.

The mapper 102 may be as described above with reference to FIG. 1A, for example. A symbol constellation in use by the mapper 102 may be determined based on the mode of operation of the transmitter (e.g., as indicated by control signal 158). The rate at which bits are mapped to symbols may be determined based on the clock signal 156. In an example embodiment of the disclosure, the mapper 102 may be operable to insert one or more pilot symbols (e.g., a particular pattern of pilot symbols) into a generated symbol sequence. In an example embodiment, the pilot symbol(s) may be inserted in a deterministic manner (e.g., periodically and/or on an event-driven basis) such that a receiver of the signal may know, or be able to autonomously determine, that the symbols are pilot symbols and not information symbols (information symbols being symbols generated from data bits input to the mapper 102). In an example implementation, a common symbol constellation may be used for both the pilot symbols and the information symbols. In another example implementation, a first symbol constellation (e.g., a 32QAM-based PR10 constellation) may be used for information symbols and a second symbol constellation (e.g., a BPSK or QPSK constellation) may be used for pilot symbols.

The pilot overhead (POH) (i.e., the percentage of all transmitted symbols that are pilot symbols) and pattern of pilot symbols may be adapted dynamically (e.g., at or near real-time, based on recent measurements and/or feedback and/or user input) according to one or more performance indicators (e.g., SNR, SER, metrics levels calculated by module 204, amount of multipath, etc.) of the channel 108. When the transmitter is configured for near zero positive ISI, pilot symbols may be spread in time such that a single pilot is inserted for every N information symbols. In this manner, the pilot symbols may support the carrier recovery loop in the presence of phase noise and may prevent cycle slips by providing side information on the phase error present at the time of transmission of the pilot symbol. However, when the transmitter is configured in a mode that generates ISC signals whose values are, at any given time, based on a plurality of symbols, it may be advantageous to use several adjacent (or closely distributed) pilot symbols in order to provide efficient side information for the phase. Thus, symbol pilots when the transmitter is in a ISC mode, may be use a pattern of inserting group of M pilot symbols for every N information symbols, where the M symbols may be perfectly cascaded (i.e., no information symbol in between pilots) or, information symbol(s) may be inserted between some of the pilot symbols consisting the group of M. For example, the transmitter may insert 1 pilot symbol between every N information symbols when configured in a first mode of operation, and insert 2 or more consecutive pilot symbols between every N information symbols when configured in a second mode of operation.

A configuration of the ISC generation circuit 158 may be determined based on the mode of operation of the transmitter (e.g., as indicated by control signal 158). In a first configuration, the ISC generation circuit 158 may be configured to generate ISC signals. For example, in a first configuration the ISC generation circuit 158 may correspond to, and operate as, the pulse shaper 104 described herein with reference to FIGS. 1A and 2-8D. In a second configuration, the ISC generation circuit 158 may be configured as a near zero positive ISI pulse shaping filter (e.g., may be configured based on, or to approximate, a root raised cosine (RRC) pulse shaping filter). The first configuration may correspond to a first number of filter taps and/or a first set of tap coefficients. The second configuration may correspond to a second number of filter taps and/or a second set of tap coefficients. As another example, the first configuration of the ISC generation circuit 158 may be one in which it perform decimation below the Nyquist frequency such that aliasing results in an ISC signal. As another example, the first configuration of the ISC generation circuit 158 may be one in which it performs lattice coding resulting in an ISC signal.

The timing pilot insertion circuit 105 may be as described above with reference to FIG. 1A, for example. In an example implementation, the sub-harmonic of the symbol frequency at which the pilot is inserted may be determined based on the mode of operation of the transmitter (e.g., as indicated by control signal 158). That is, if the timing pilot is inserted at $F_{baud}/D$, the value of D may be controlled based on the mode of operation of the transmitter (e.g., as indicated by control signal 158). Additionally, the power of the inserted pilot signal may be controlled based on the mode of operation of the transmitter (e.g., as indicated by control signal 158). Relatedly, the timing pilot insert circuit 105 may be enabled and disabled based on the mode of operation of the transmitter (e.g., as indicated by control signal 158).

The Tx front-end 106 may be as described above with reference to FIG. 1A. Different configurations of the front-end 106 may correspond, for example, to different power back-off settings of an amplifier of the front-end 106. A larger power back-off may correspond to an operating point further away from a reference point (e.g., 1-dB compression point) than an operating point corresponding to a smaller power back-off. Consequently, a larger power back-off setting may correspond to increased linearity at the expense of decreased transmitted power and energy efficiency.

In operation, the transmitter may support a plurality of modes, with each of the modes corresponding to a particular configuration of each of the mapper 102, ISC generation circuit 158, timing pilot insert circuit 105, Tx Front-End circuit 106, and clock 152. The transmitter may be configured dynamically (e.g., at or near real-time, based on recent measurements and/or feedback and/or user input). In an example implementation, the transmitter may support the two modes characterized by the parameters shown in table 1,

TABLE 1

| Mode | Mapper 102 | ISC generation circuit 158 | Clock 152 | Pilot insert 105 | Front-end 106 |
| --- | --- | --- | --- | --- | --- |
| 1 | N-QAM | RRC, BW1 | $F_{b1}$ | $F_{b1}/D$ | $P_1 > PBO1 > P_2$ |
| 2 | M-QAM | PR, BW2 | $F_{b2}$ | $F_{b2}/D$ | $P_1 > PBO2 > P_3$ | where N and M are integers; D is a real number; $F_{b1}$ is baud rate in mode 1; $F_{b2}$ is the baud rate in mode 2; PBO1 is the power back-off setting of an amplifier of the front-end 106 in mode 1; PBO2 is the power back-off setting of the amplifier of the front-end 106 in mode 2; and $P_1$, $P_2$ and $P_3$ are three back-off limits where $P_1 > P_2 > P_3$ such that $P_1$ corresponds to an operating point that is further from a reference point than an operating point corresponding to $P_2$, and $P_2$ corresponds to an operating point that is further from the reference point than an operating point corresponding to $P_3$ (i.e., $P_3$ results in higher transmitted power and more non-linear distortion than $P_2$, and $P_2$ results in higher transmitted power and more non-linear distortion than $P_1$). In such an implementation, the mapper 102, ISC generation circuit 158, clock 152, pilot insert circuit 105, and front-end 106 may be configured such that the two modes in table 1 achieve the same throughput in the same bandwidth (i.e., same spectral efficiency) but with different symbol constellations. That is, mode 1 may achieve a particular throughput using an N-QAM constellation, RRC pulse shape filtering with an effective bandwidth of BW1, a first baud rate $F_{b1}$, and an amplifier setting with lower non-linear distortion, whereas mode 2 may achieve the throughput using a M-QAM symbol constellation (N>M), partial response (PR) pulse shape filtering with effective bandwidth of BW2=BW1, a second baud rate $F_{b2}$=log 2(N)/log 2(M)× $F_{b1}$, and an amplifier setting with higher non-linear distortion.

In an example implementation, M=N (i.e., the two modes use the same constellation), BW2=BW1/X, $F_{b1}=F_{b2}$ (i.e., the two modes use the same baud rate), and PBO1=PBO2 (i.e., the two modes use the same power back-off setting of an amplifier), and mode 2 achieves the same throughput as mode 1, but using a factor of X less bandwidth, as a result of the increased spectral efficiency of mode 2.

Figure 1C:
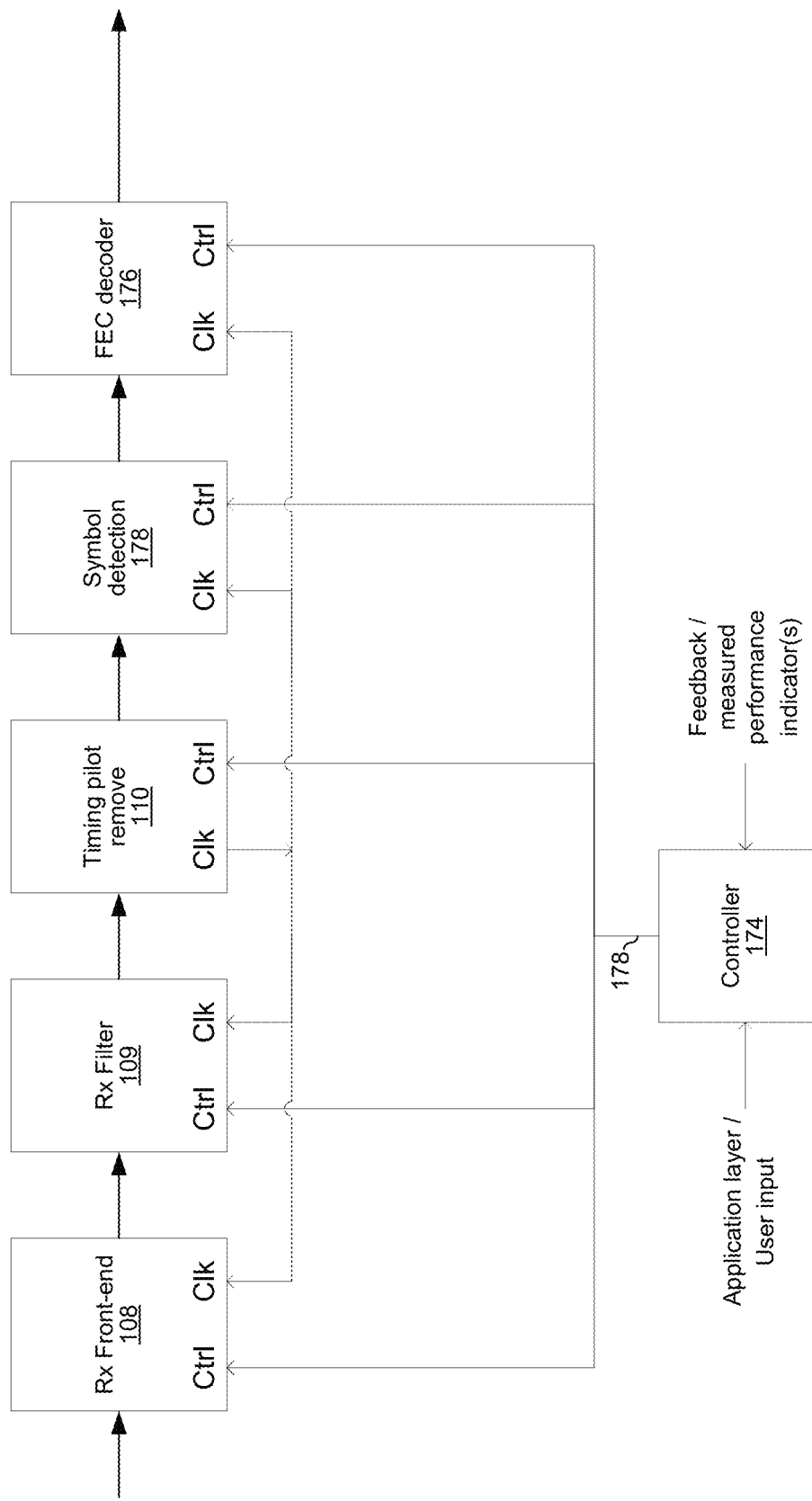
FIG. 1C is a block diagram illustrating a multi-mode transmitter operable to support low-complexity, highly-spectrally-efficient communications.

FIG. 1C is a block diagram illustrating a multi-mode receiver operable to support low-complexity, highly-spectrally-efficient communications. Shown in FIG. 1C, are the Rx Front-end 108, the Rx filter 109, the timing pilot removal circuit 110, a symbol detection circuit 178, a control circuit 174, and an FEC decoder circuit 176.

The control circuit 174 may comprise, for example, an application specific integrated circuit (ASIC), a programmable interrupt controller (PIC), an ARM-based processor, an x86-based processor, and/or any other suitable circuitry operable to control a configuration of the receiver based on one or more parameters. The parameters on which the configuration of the receiver may be based may include, for example, input from a user of, and/or software application running on, a device (e.g., a mobile phone, laptop, base station, or the like) in which the receiver resides. The parameters on which the configuration of the receiver may be based may include performance indicators measured by circuitry of the receiver such as, for example, measured noise levels, temperature, battery charge level, symbol error rate (SER), bit error rate (BER), signal-to-noise ratio (SNR), metrics calculated by a sequence estimation circuit, a non-linear model in use by the receiver, a phase error measured by the receiver, a measurement indicative of an amount of multipath in the channel, and/or any other relevant performance indicator. The parameters on which the configuration of the receiver may be based may include characteristics of data to be received. Such characteristics may include, for example, quality of service parameters (e.g., latency and/or throughput requirements) and/or a model of non-linear distortion experienced by the data during transmission, propagation over the channel, and/or reception by the receiver. The parameters on which the configuration of the receiver may be parameters communicated (e.g., in a beacon signal) by a transmitter from which the receiver desires to receive communications. Such parameters may include, for example, power back-off (and/or other indications of non-linearity) symbol constellation in use, type of pulse shape filtering in use, baud rate, etc. The parameters on which the configuration of the receiver may be based may include a mode of operation of a transmitter from which the receiver desires to receive communications. Such mode of operation may, for example, be communicated to the receiver in a control message (e.g., in a beacon signal) and relayed to the control circuit 174.

The control circuit 174 may also be operable to generate control messages that indicate a configuration of the receiver. Such control messages may be, for example, inserted into the transmitted datastream and/or transmitted on a control channel of beacon signal, to provide feedback to a transmitter. Such control messages may be used by a multi-mode transmitter for configuration of its circuitry.

The timing pilot removal circuit 110 may be as described above and may, for example, comprise one or more phase locked loops (PLLs) for recovering the symbol timing of received signals and outputting a clock signal determined by the recovered symbol timing.

The Rx front-end 108 may be as described above with reference to FIG. 1A, for example. Different configurations of the front-end 108 may correspond, for example, to different combination of power back-off settings of one or more gain circuits (e.g., amplifiers and/or attenuators) of the front-end 108. A larger power back-off may correspond to an operating point further away from a reference point (e.g., 1-dB compression point) than an operating point corresponding to a smaller power back-off. Consequently, a larger power back-off setting may correspond to increased linearity at the expense of decreased energy efficiency and/or increased noise figure.

A configuration of the Rx filter 109 may be determined based on the mode of operation of the receiver (e.g., as indicated by the control signal 178). In a first configuration, the Rx filter 109 may operate as described herein with reference to FIGS. 1A and 2-8D. That is, in a first configuration, the Rx filter 109 may be configured to achieve a desired total partial response. In a second configuration, however, the Rx filter 109 may be configured as a near zero positive ISI pulse shaping filter (e.g., root raised cosine (RRC) pulse shaping filter). The first configuration may correspond to a first number of filter taps and/or a first set of tap coefficients. The second configuration may correspond to a second number of filter taps and/or a second set of tap coefficients.

A configuration of the symbol detection circuit 178 may be determined based on the mode of operation of the receiver (e.g., as indicated by the control signal 178). In a first configuration, the symbol detection circuit 178 may operate as the equalization and sequence estimation circuit 112 described herein with reference to FIGS. 1A and 2-8D, for example. That is, in a first configuration, the symbol detection circuit 178 may detect/estimate sequences of ISC symbols. In a second configuration, however, the symbol detection circuit 178 may perform symbol slicing according to a particular constellation (e.g., a QAM constellation) to detect/estimate individual symbols (i.e., sequences only one symbol in length). Accordingly, in the second configuration, the equalization and symbol detection circuit 178 may perform slicing and each estimate/decision (hard or soft) may depend only on the current symbol. Thus, configuration of the equalization and symbol detection circuit 178 may be based, for example, on an indication of inter symbol correlation in a received signal. In case of severe channel multipath and/or phase noise that create a correlation between received symbols, symbol detection circuit 178 may be configured for decoding symbols by sequence estimation method to improve decoding performance comparing to symbol-by-symbol slicing/decision.

The FEC decoder 176 may be perform FEC decoding according to one or more algorithms such as Reed-Solomon, or low-density parity check (LDPC) algorithms. The FEC code rate and/or the decoding algorithm used may be determined based on the mode of operation of the transmitter (e.g., as indicated by control signal 178). For example, FEC type (e.g., LDPC, RS, etc.) may be switched to match the modulation type and FEC rate may be optimized to increase capacity based on the mode of operation of the transmitter. In some cases of iterative FEC codes (e.g., LDPC, turbo), the code structure may vary to utilize the statistical characteristics of the partial response signal errors. FEC decoding performance may be improved through dynamic selection of the appropriate error model. For example, the factor graph which defines the code structure may incorporate code constraints as well as the partial response behavior. Additionally, bits LLR that are the input to the FEC may be shaped as needed.

In operation, the receiver may support a plurality of modes, with each of the modes corresponding to a particular configuration of each of the Rx Front-end 108, the Rx filter 109, the timing pilot removal circuit 110, the equalization and symbol detection circuit 178, and a control circuit 174. The receiver may be configured dynamically (e.g., at or near real-time, based on recent measurements and/or feedback). In an example implementation, the receiver may support the two modes characterized by the parameters shown in table 2,

TABLE 2

| Mode | Rx Filter 109 | Clock 152 | Front-end 108 | symbol detection circuit 178 |
|---|---|---|---|---|
| 1 | RRC, BW1 | $F_{b1}$ | $P_4 > PBO3 > P_5$ | Slice |
| 2 | PR, BW2 | $2 \times F_{b1}$ | $P_4 > PBO4 > P_6$ | Seq. est. | where $F_{b1}$ is the baud rate for mode 1; PBO3 is the power back-off setting of an amplifier of the front-end 108 in mode 1; PBO4 is the power back-off setting of an amplifier of the front-end 108 in mode 2; and $P_4$, $P_5$ and $P_6$ are three back-off limits where $P_4>P_5>P_6$ such that $P_4$ corresponds to an operating point that is further from a reference point than an operating point corresponding to $P_5$, and $P_5$ corresponds to an operating point that is further from the reference point than an operating point corresponding to $P_6$ (i.e., $P_6$ results in more non-linear distortion than $P_5$, and $P_5$ results in more non-linear distortion than $P_4$). In the receiver, there is a tradeoff between linearity and noise figure performance. Allowing high non-linear distortion may enable improving the overall noise figure which, in turn, may improve demodulator sensitivity. Thus, a receiver capable of tolerating severe non-linear distortion may permit configuring that receiver for optimal noise figure.

Figure 10:
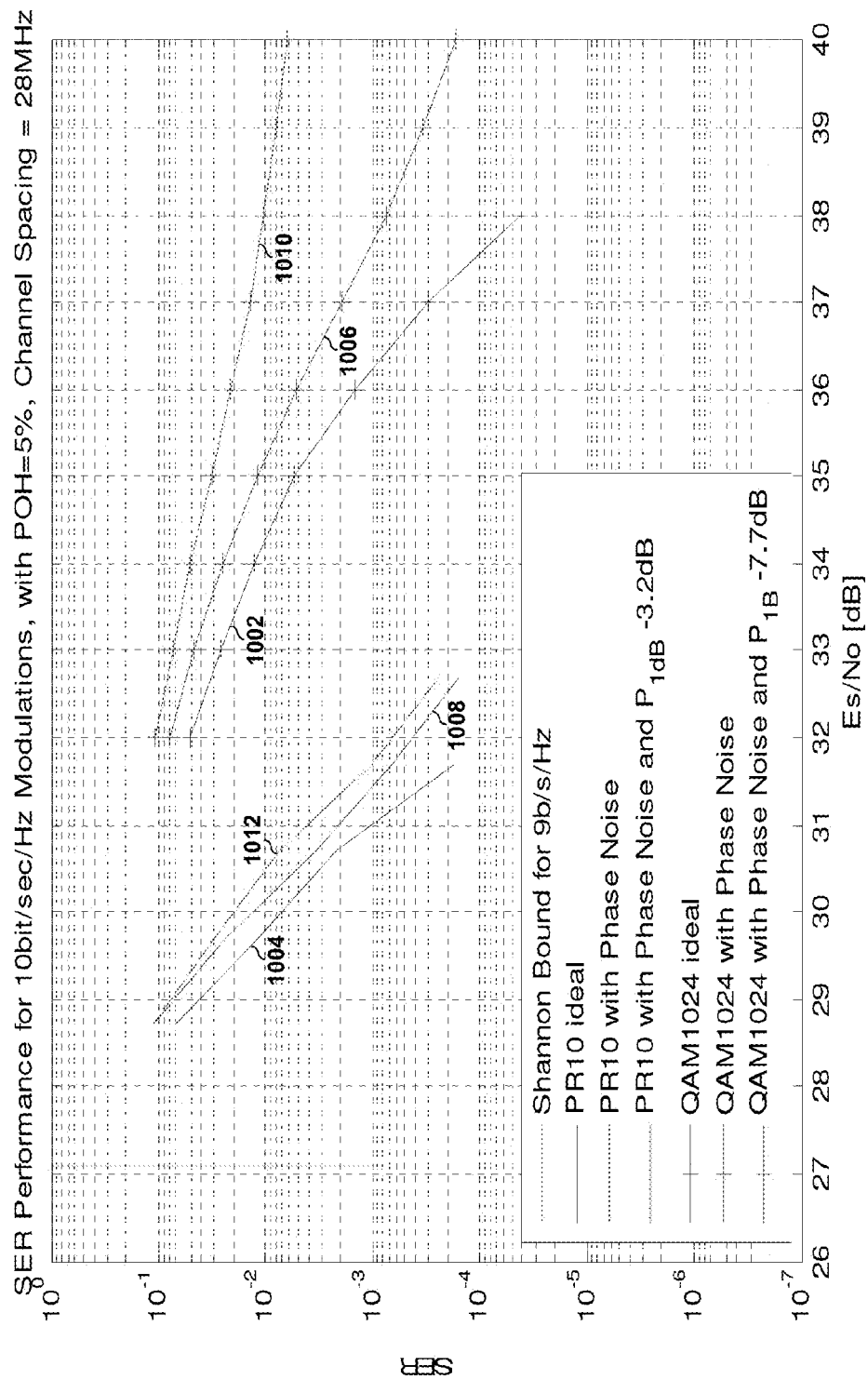
FIG. 10 compares between Symbol Error Rate (SER) vs. SNR of the receiver configured into mode 1 of table 2 and configured into mode 2 of table 2.

In such an implementation, the Rx front-end 108, Rx filter 109, and equalization and symbol detection circuit 178 may be configured such that mode 2 provides better reception (e.g., lower SER) around the operating SNR (e.g., 30 dB SNR) than mode 1 for the same throughput and same spectral efficiency. For a given received signal level (RSL), the system at mode 2 may improve SNR comparing to mode 1 due to the ability to tolerate larger non-linear distortion originating at the receiver front-end and consequently decrease the noise figure which increase observed SNR. FIG. 10 depicts SER vs. SNR for modes 1 and 2 under example constraints.

Figure 2:
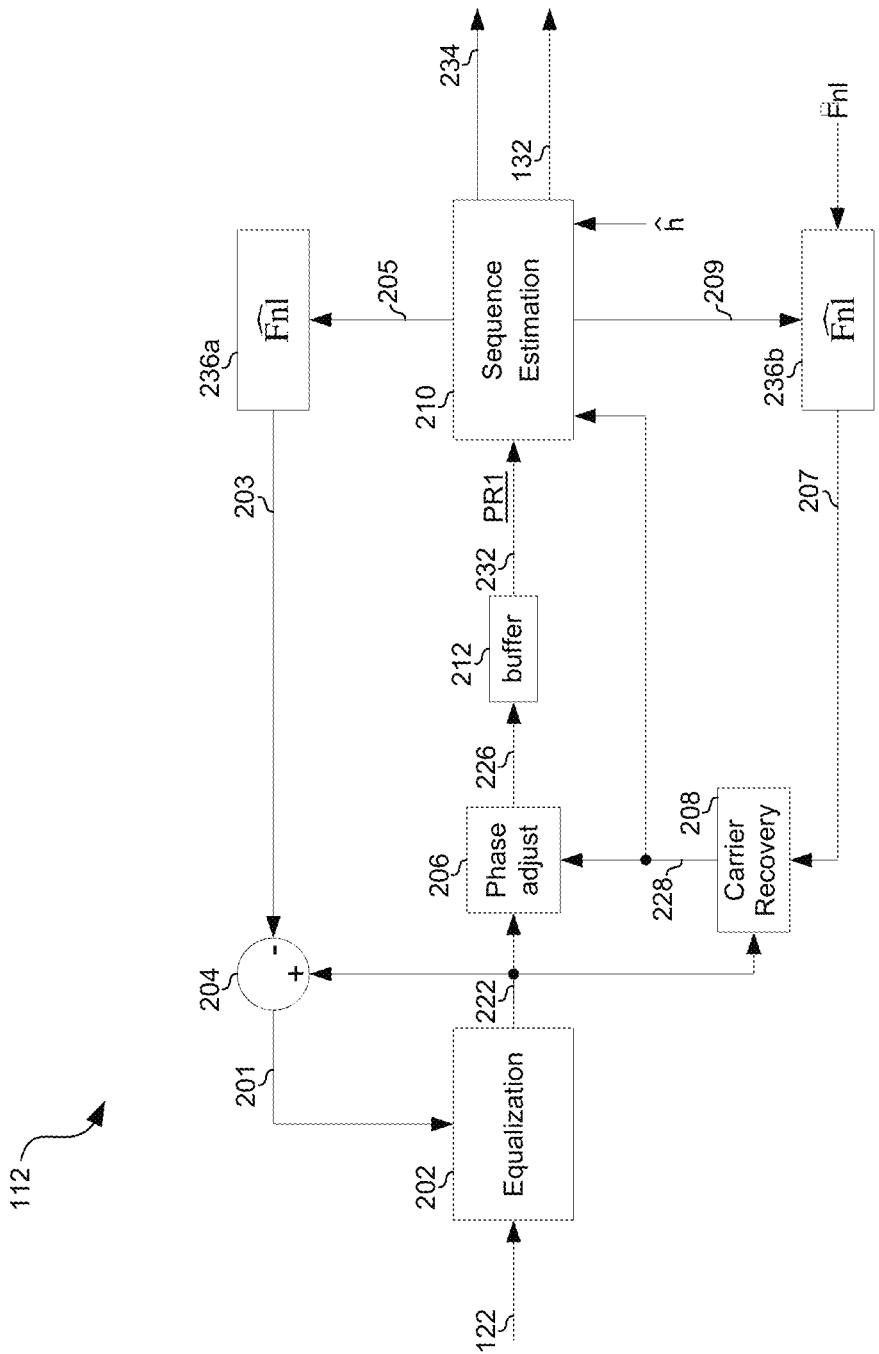
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response $\hat{h}$. Response $\hat{h}$ is based on h (the total partial response, discussed above). For example, response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, response $\hat{h}$ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
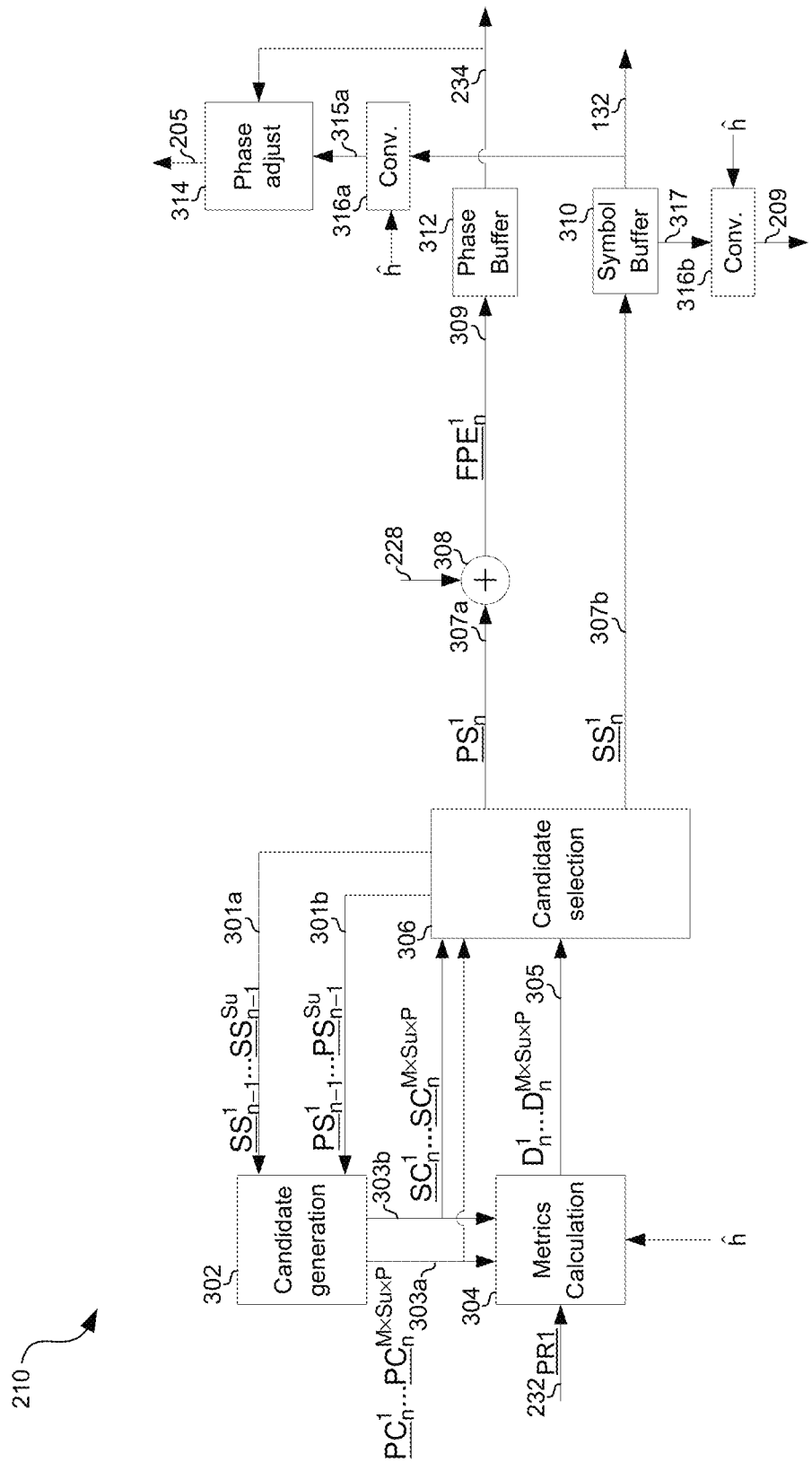
FIG. 3 is a block diagram depicting an example sequence estimation circuit for use in a system configured for low-complexity, highly-spectrally-efficient communications.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$ and the signal 303b conveying the symbol candidate vectors $SC_n^1 \ldots SC^{M \times Su \times P}$ where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described below with respect to FIGS. 5A-5D and in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols. An example implementation of the metrics calculation block is described below with reference to FIG. 4.

The candidate selection circuit 306 may be operable to select Su of the symbol candidates $SC_n^1 \ldots SC^{M \times Su \times P}$ and Su of the phase candidates $PC_n^1, \ldots PC^{M \times Su \times P}$ based on the metrics $D_n^1 \ldots D_n^{M \times Su \times P}$ The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS^{Su}$ Each element of each symbol survivors $SS_n^1 \ldots SS_n^{Su}$ may comprise a soft decision estimate and/or a hard-decision estimate of a symbol of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described below with reference to FIGS. 5D and 6A-6B.

The candidate generation circuit 302 may be operable to generate phase candidates $PC_n^1 \ldots PC_n^{M \times Su \times P}$ and symbol candidates $SC_n^1 \ldots SC_n^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described below with reference to FIGS. 5A and 5B and/or in the United States patent application titled "Joint Sequence Estimation of Symbol and Phase with High Tolerance of Nonlinearity," which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors. Example implementations of the buffers 310 and 312 are described below with reference to FIGS. 8A and 8B, respectively.

The combiner circuit 308 may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response $\hat{h}$, resulting in the partial response signal 315a. Similarly, the convolution circuit 316b may be operable to convolve the signal 317 with response $\hat{h}$, resulting in the partial response signal 209. As noted above, response $\hat{h}$ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response $\hat{h}$ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
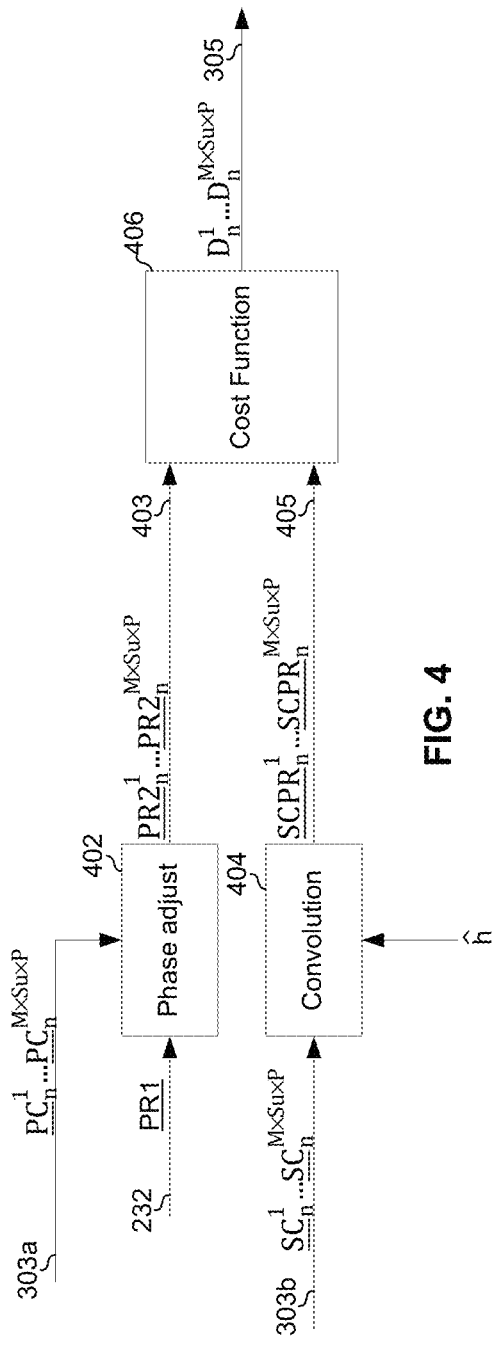
FIG. 4 is a block diagram depicting an example metric calculation circuit for use in a system configured for low-complexity, highly-spectrally-efficient communications.

FIG. 4 is a block diagram depicting an example metric calculation circuit for use in a system configured for low-complexity, highly-spectrally-efficient communications. Shown is a phase adjust circuit 402, a convolution circuit 404, and a cost function calculation circuit 406. The phase adjust circuit 402 may phase shift one or more elements of the vector PR1 (conveyed via signal 232) by a corresponding one or more values of the phase candidate vectors $PC_n^1 \ldots PC_n^{M \times Su \times P}$ The signal 403 output by the phase adjust circuit 402 thus conveys a plurality of partial response vectors $PR2_n^1 \ldots PR2_n^{M \times Su \times P}$, each of which comprises a plurality of phase-adjusted versions of PR1.

The circuit 404, which performs a convolution, may comprise a FIR filter or IIR filter, for example. The circuit 404 may be operable to convolve the symbol candidate vectors $SC_n^1 \ldots SC^{M \times Su \times P}$ with $\hat{h}$. The signal 405 output by the circuit 404 thus conveys vectors $SCPR_n^1 \ldots SCPR_n^{M \times Su \times P}$ each of which is a candidate partial response vector.

The cost function circuit 406 may be operable to generate metrics indicating the similarity between one or more of the partial response vectors $PR2_n^1 \ldots PR2_n^{M \times Su \times p}$ and one or more of the vectors $SCPR_n^1 \ldots SCPR_n^{M \times Su \times P}$ to generate error metrics $D_n^1 \ldots D_n^{M \times Su \times P}$ In an example implementation, the error metrics may be Euclidean distances calculated as shown below in equation 1.

$$D_n^i = |(SCPR_n^i) - (PR2_n^i)|2 \qquad \text{EQ. 1}$$

for $1 \leq i \leq M \times Su \times P$.

FIGS. 5A-5D depict portions of an example sequence estimation process performed by a system configured for low-complexity, highly-spectrally-efficient communications. In FIGS. 5A-5D it is assumed, for purposes of illustration, that M=4 (a symbol alphabet of $\alpha,\beta,\chi,\delta$), Su=3 (three symbol survivors are selected each iteration), Psu=Su (three phase survivors are selected each iteration), P=3 (a phase alphabet of plus, minus, and zero), and that Q (vector length) is 4.

Figure 5A:
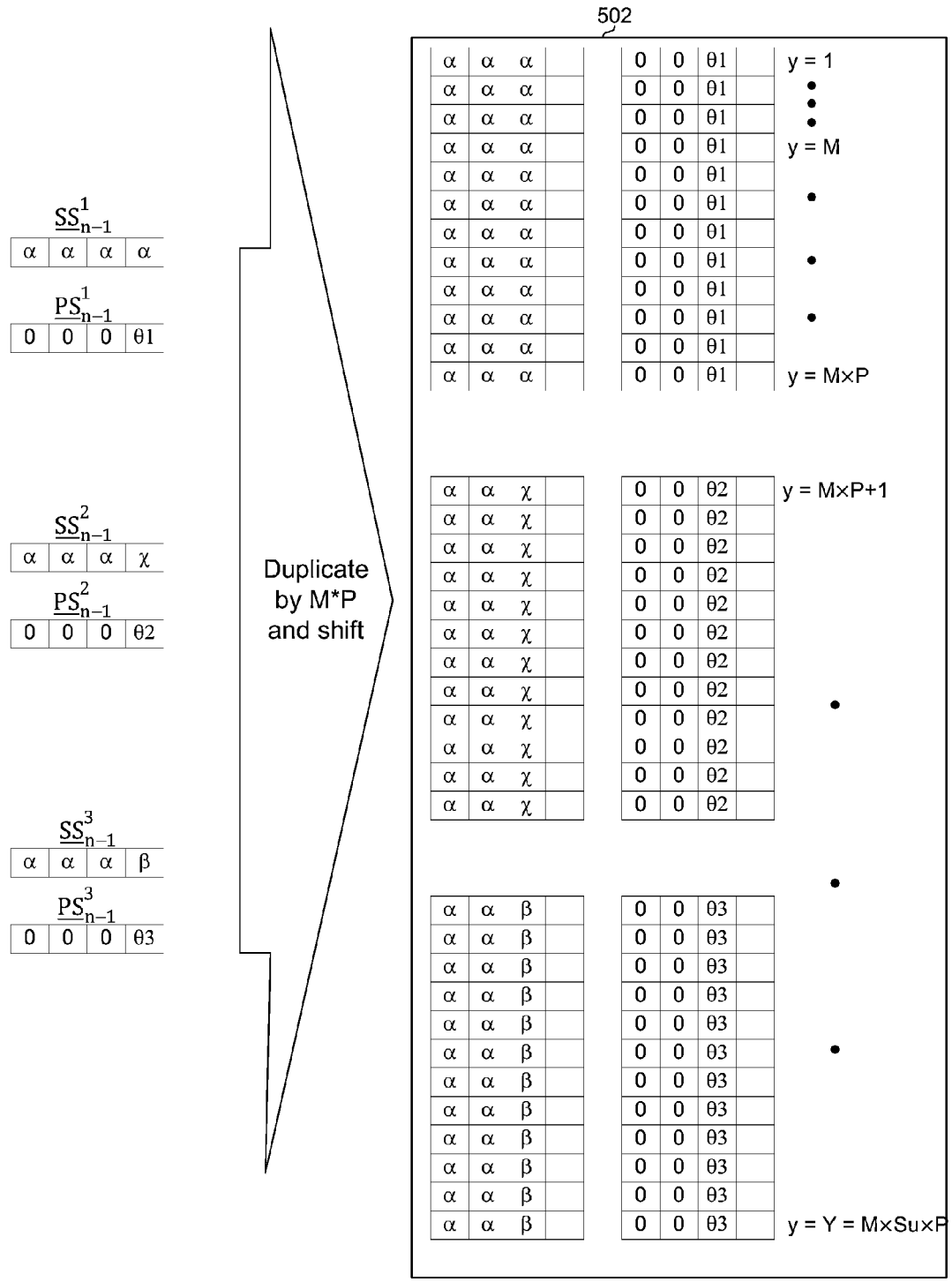
FIGS. 5A-5D depict portions of an example sequence estimation process performed by a system configured for low-complexity, highly-spectrally-efficient communications.

Referring to FIG. 5A, there is shown phase and symbol survivors from time n−1 on the left side of the figure. The first step in generating symbol candidates and phase candidates from the survivors is to duplicate the survivors and shift the contents to free up an element in each of the resulting vectors called out as 502 on the right side of FIG. 5A. In the example implementation depicted, the survivors are duplicated M*P−1 times and shifted one element.

Figure 5B:
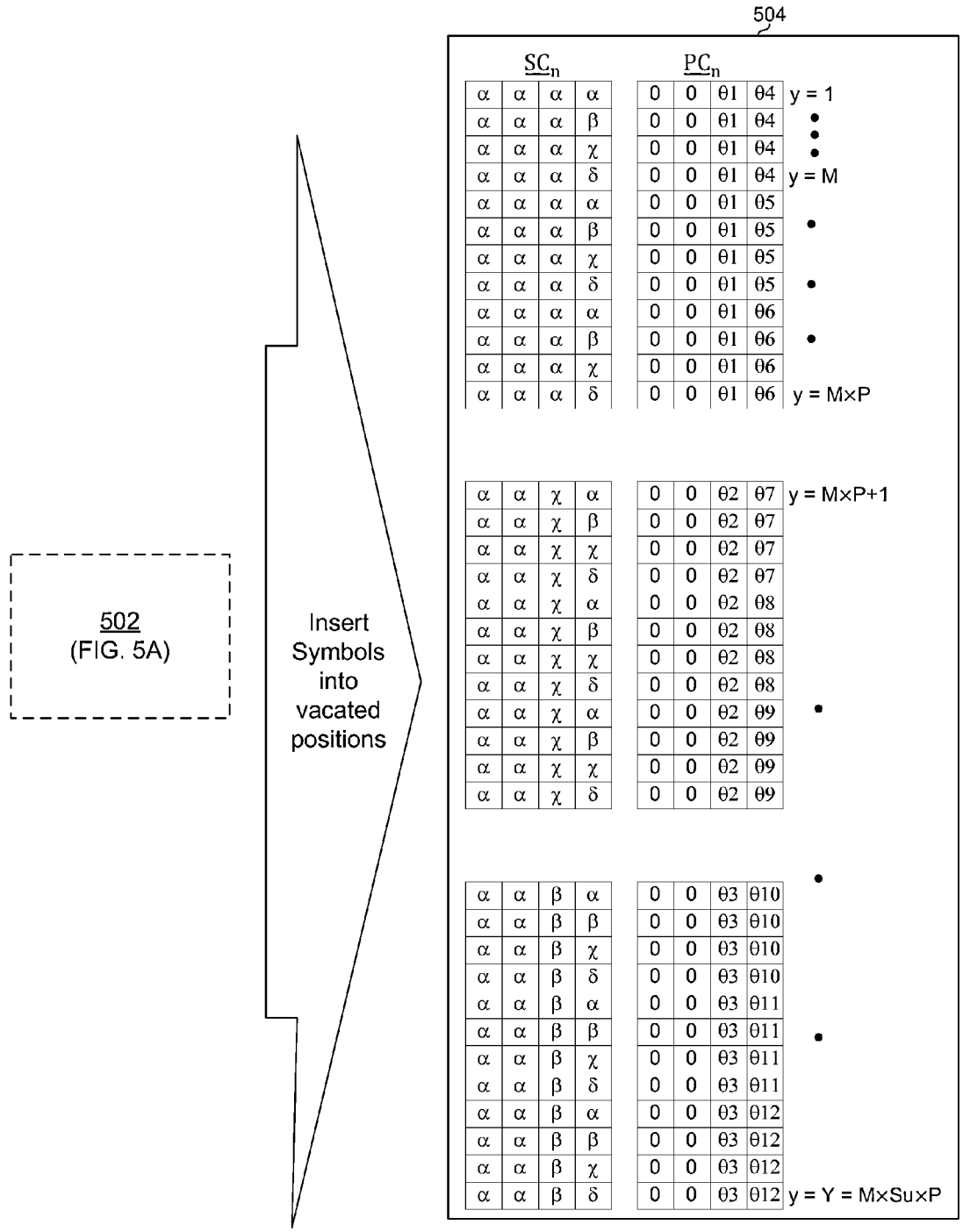

Referring to FIG. 5B, the next step in generating the candidates is inserting symbols in the vacant elements of the symbol vectors and phase values in the vacant elements of the phase vectors, resulting in the symbol candidates and phase candidate for time n (called out as 504 in FIG. 5B). In the example implementation depicted, each of the M possible symbol values is inserted into Su*P symbol candidates, and each of the P phase values may be inserted into M*Su candidates. In the example implementation depicted, θ5 is a reference phase value calculated based on phase survivor $PS_{n-1}^1$. For example, θ5 may be the average (or a weighted average) of the last two or more elements of the phase survivor $PS_{n-1}^1$ (in the example shown, the average over the last two elements would be (θ5+0)/2). In the example implementation depicted, θ4=θ5−Δθ, and θ6=θ5+Δθ, where Δθ is based on: the amount of phase noise in signal 226, slope (derivative) of the phase noise in signal 226, signal-to-noise ratio (SNR) of signal 226, and/or capacity of the channel 107. Similarly, in the example implementation shown, θ8 is a reference phase value calculated based on phase survivor $PS_{n-1}^2$, θ7=θ8−Δθ, θ9=θ8+Δθ, θ11 is a reference phase value calculated based on phase survivor $PS_{n-1}^3$, θ10=θ11−Δθ, and θ12=θ11+Δθ.

Figure 5C:
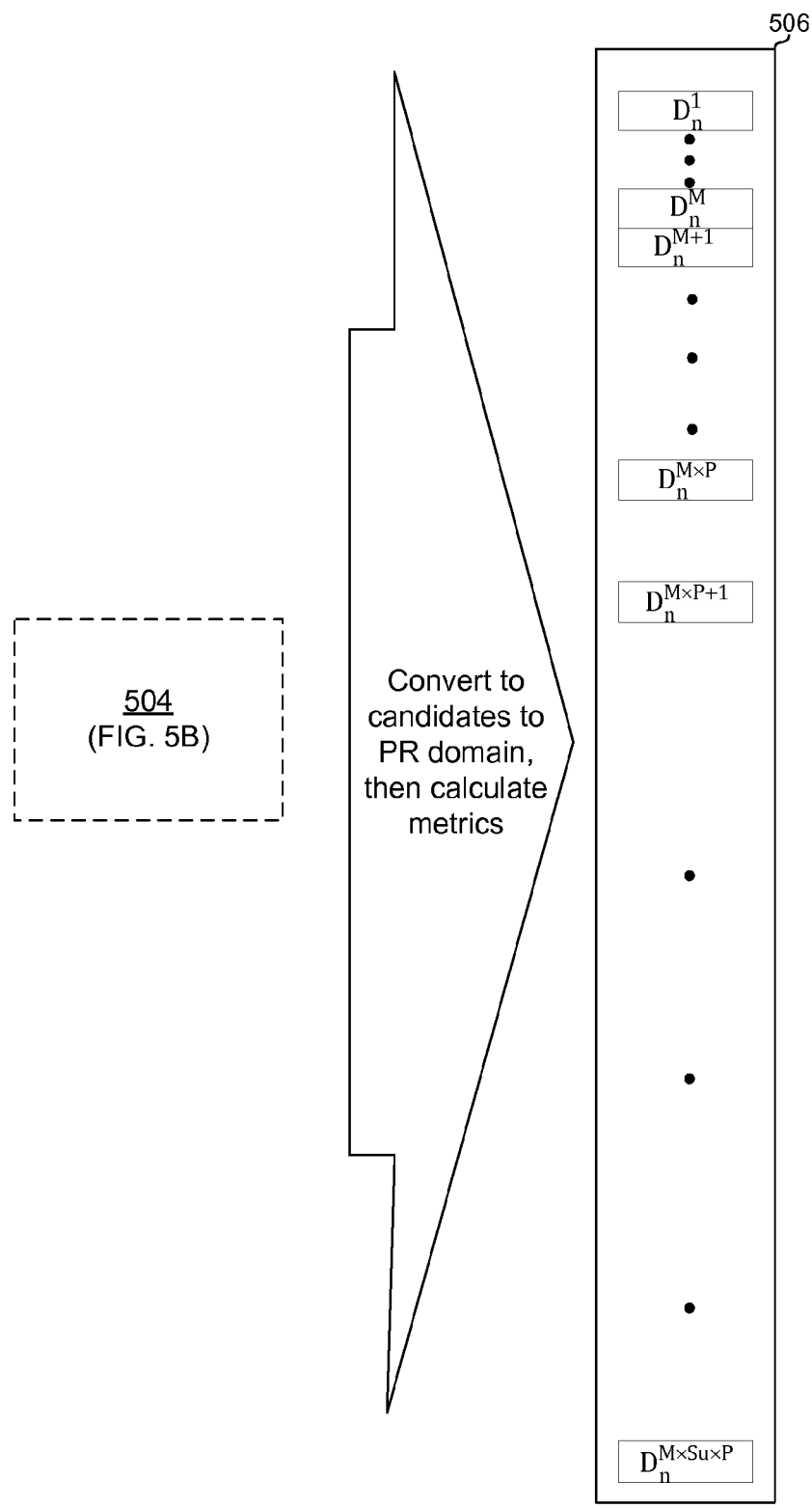

Referring to FIG. 5C, as described above with reference to FIG. 4, the symbol candidates are transformed to the partial response domain via a convolution, the reference signal PR1 is phase adjusted, and then the metrics $D_n^1 \ldots D_n^{M \times Su \times P}$ are calculated based on the partial response signals $PR2_n^1, \ldots PR2_n^{M \times Su \times P}$ and $SCPR_n^1 \ldots SCPR_n^{M \times Su \times P}$.

Figure 5D:
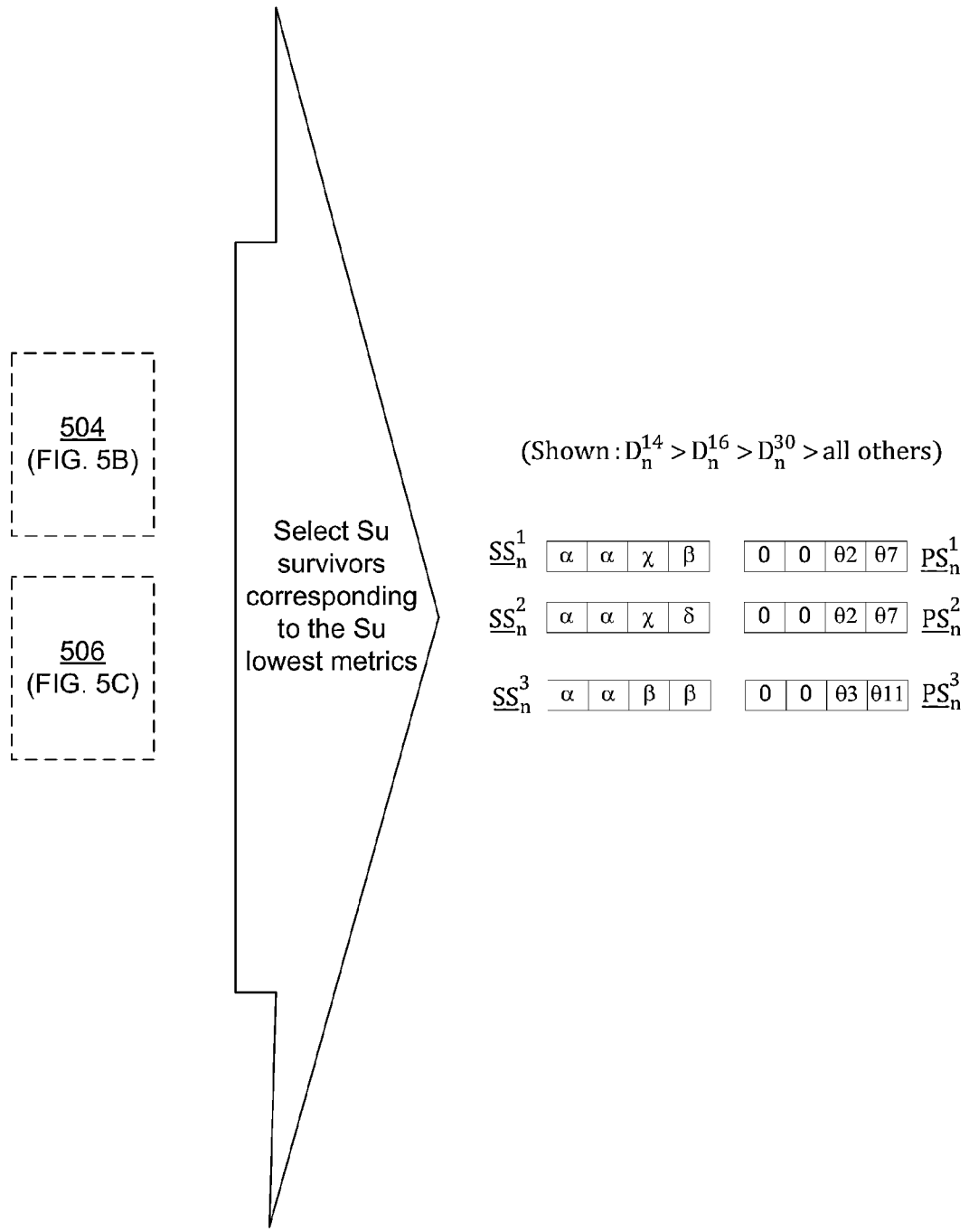

Referring to FIG. 5D, the metrics calculated in FIG. 5C are used to select which of the candidates generated in FIG. 5B are selected to be the survivors for the next iteration of the sequence estimation process. FIG. 5D depicts an example implementation in which the survivors are selected in a single step by simply selecting Su candidates corresponding to the Su best metrics. In the example implementation depicted, it is assumed that metric $D_n^{14}$ is the best metric, that $D_n^{16}$ is the second best metric, and that $D_n^{30}$ is the third-best metric. Accordingly, symbol candidate $SC_n^{14}$ is selected as the best symbol survivor, $PC_n^{14}$ is selected as the best phase survivor, symbol candidate $SC_n^{16}$ is selected as the second-best symbol survivor, $PC_n^{16}$ is selected as the second-best phase survivor, symbol candidate $SC_n^{30}$ is selected as the third-best symbol survivor, and $PC_n^{30}$ is selected as the third-best phase survivor. The survivor selection process of FIG. 5D may result in selecting identical symbol candidates which may be undesirable. A survivor selection process that prevents redundant symbol survivors is described below with reference to FIGS. 6A and 6B.

Figure 6A:
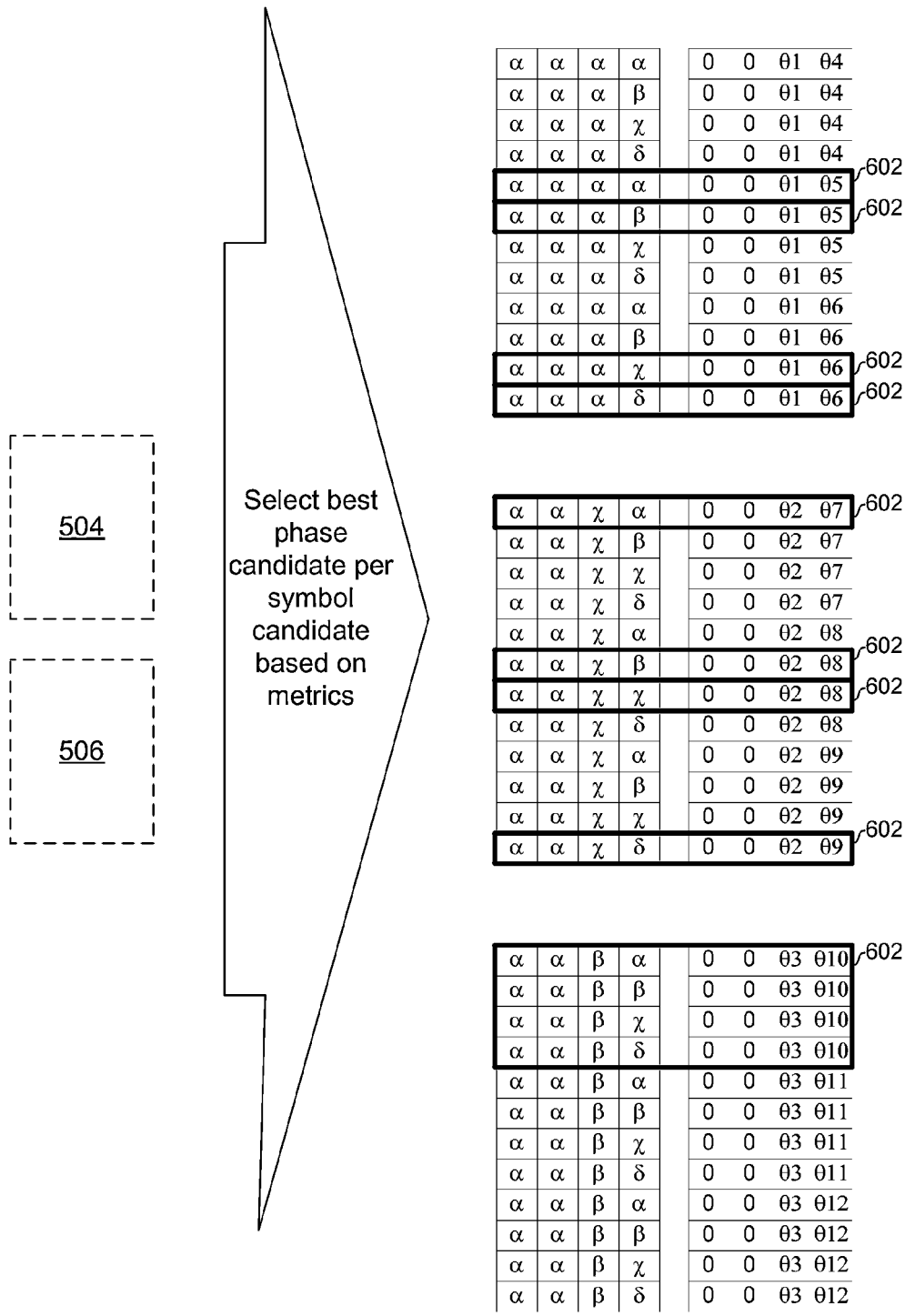
FIGS. 6A and 6B depict an example survivor selection process that is an alternative to the process depicted in FIG. 5D.
Figure 6B:
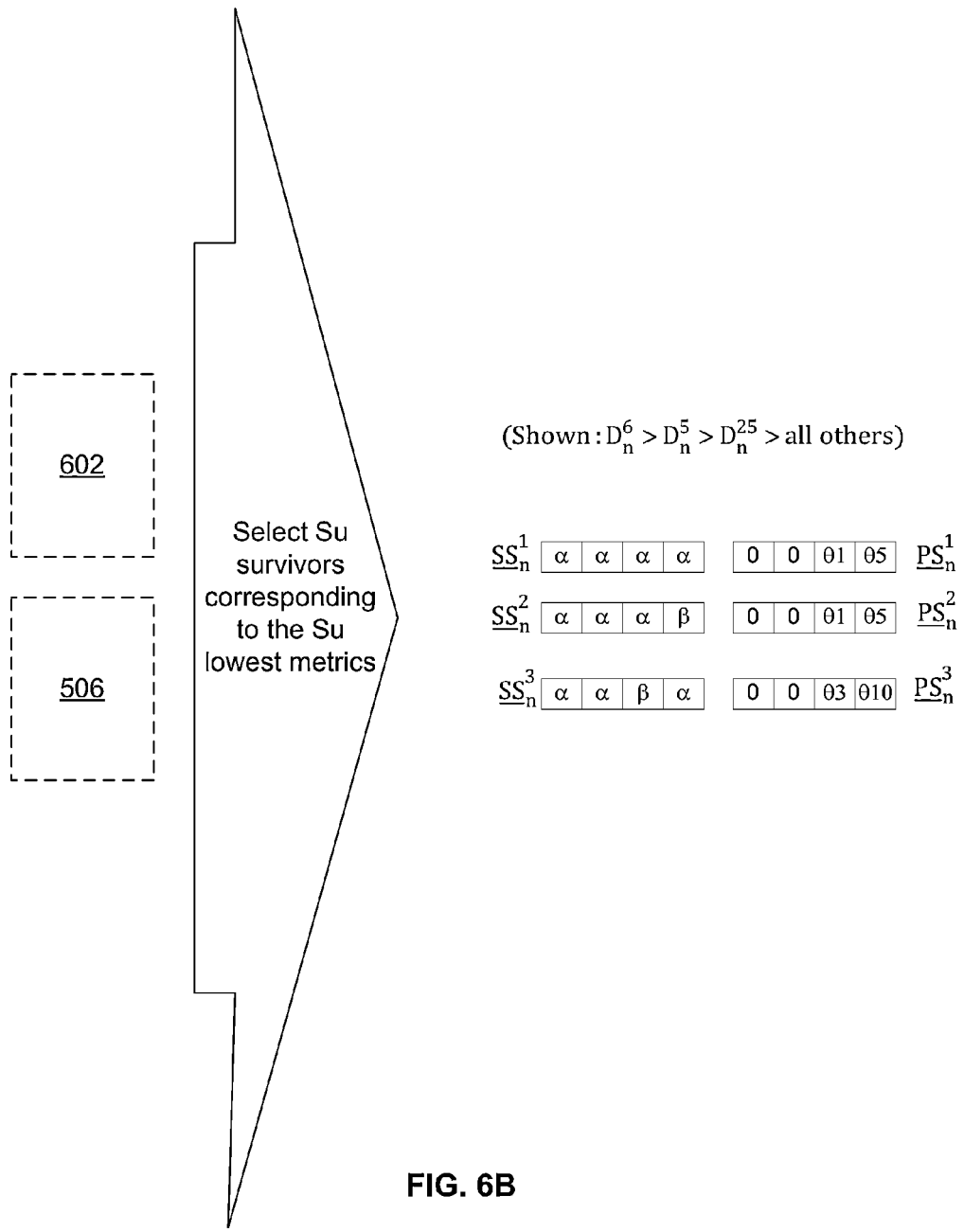

FIGS. 6A and 6B depict an example survivor selection process that is an alternative to the process depicted in FIG. 5D. In FIG. 6A, the candidates generated in FIG. 5B and the metrics calculated in FIG. 5C are used to select the best phase candidate for each symbol candidate (selected candidates are called out by reference designator 602). In FIG. 6B, the best Su of the candidates selected in FIG. 6A are selected as the survivors for the next iteration of the sequence estimation process. In the example implementation depicted, it is assumed that metric $D_n^6$ is the best metric, that $D_n^5$ is the second-best metric, and that $D_n^5$ is the third-best metric. Accordingly, symbol candidate $SC_n^6$ is selected as the best symbol survivor, $PC_n^6$ is selected as the best phase survivor, symbol candidate $SC_n^5$ is selected as the second-best symbol survivor, $PC_n^5$ is selected as the second-best phase survivor, symbol candidate $SC_n^{25}$ is selected as the third-best symbol survivor, and $PC_n^{25}$ is selected as the third-best phase survivor.

Although the implementations described with reference to FIGS. 5A-6B use one phase survivor per symbol survivor. Other example implementations may use PSu (e.g., PSu<Su) phase survivors that are used commonly for each symbol survivor. In such an implementation, each of the phase survivors $PS_{n-1}^1 \ldots PS_{n-1}^{PSu}$ may be duplicated P times to generate phase successors, and then duplicated M*Su times to be associated with corresponding symbols successors. The number of symbol candidates in such an implementation would be M*Su*PSu*P.

Figure 7:
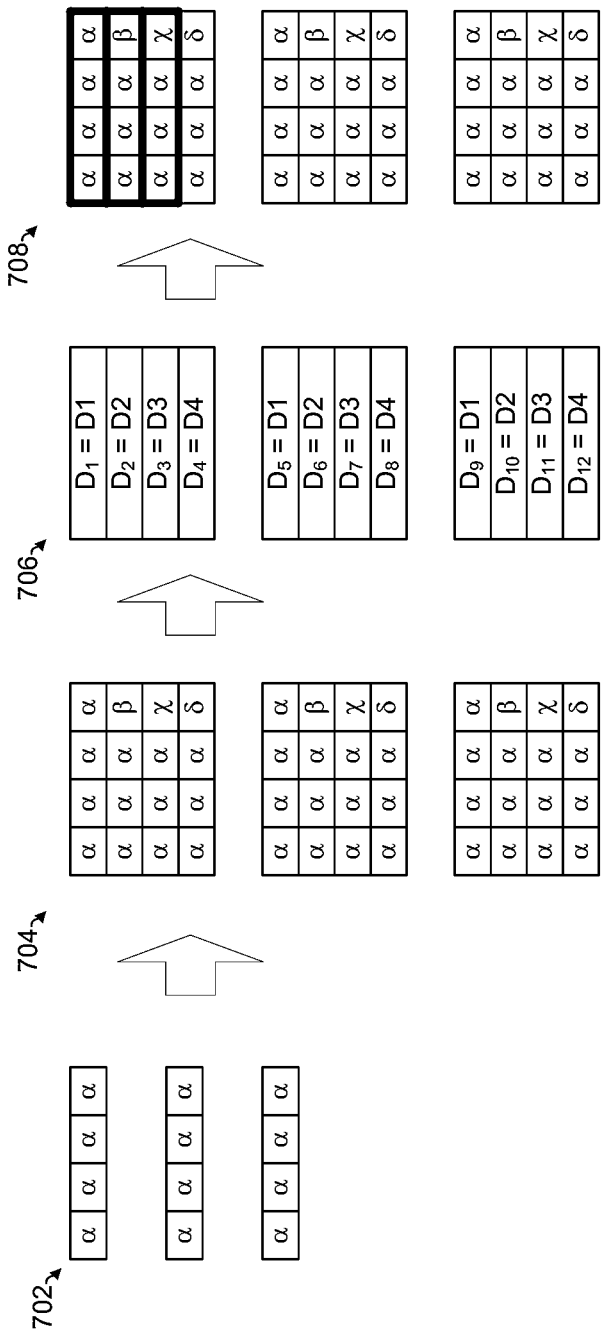
FIG. 7 is a diagram illustrating initialization of the sequence estimation process.

FIG. 7 is a diagram illustrating initialization of the sequence estimation process. In FIG. 7 it is again assumed, for illustration, that M=4 (a symbol alphabet of $\alpha,\beta,\chi,\delta$), Su=3 (three symbol survivors are selected each iteration), Psu=Su (three phase survivors are selected each iteration), P=3 (a phase alphabet of plus, minus, and zero), and that Q (vector length) is 4. On the far left of FIG. 7 is shown symbol survivors 702 after receipt of a preamble sequence. Because the preamble is a deterministic sequence, all symbol survivors are forced to the same values. From the survivors 702 are generated the candidates 704 and metrics 706 are calculated based on the candidates 704. In the example implementation shown, since the survivors were all the same, there are only four unique symbol candidates. The metrics for the four candidates are, respectively, D1, D2, D3, and D4. Accordingly, if the three candidates corresponding to the best three metrics were chosen, then the three candidates corresponding to D1 would all be chosen and the survivors for the next iteration would again all be identical. Accordingly, the three best, non-redundant symbol candidates are selected (as indicated by the heavy lines). Consequently, one of the candidates having the metric value D1 is selected, one of the candidates having the metric value D2 is selected, and one of the candidates having metric value D3 is selected, such that three non-redundant survivors are used for the next iteration.

FIG. 8A depicts an example implementation of the phase buffer shown in FIG. 3. In the example implementation depicted, the depth of the phase buffer 312 is Q and the phase value stored at element q is represented as $Z_q$, for q from 1 to Q. In the example implementation depicted, the value stored in element q3 is output as the signal 234. For each iteration of the sequence estimation process, Q elements of the phase buffer 312 storing Q values of $PS_{n-1}^1$ may be overwritten with Q values of $PS_n^1$.

Figure 8C:
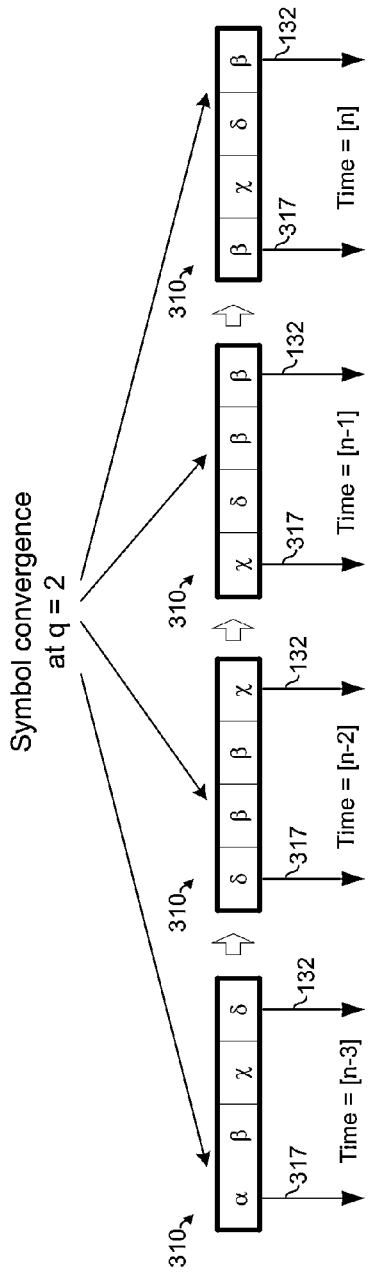
FIG. 8C depicts contents of an example symbol buffer over a plurality of iterations of a sequence estimation process.

FIG. 8B depicts an example implementation of the symbol buffer shown in FIG. 3. In the example implementation depicted, the value(s) stored in one or more elements starting with index q1 (e.g., values stored in elements q1 through q1+L) is/are output as the signal 317 and the value(s) stored in one or more elements starting with index q2 (e.g., values stored in elements q2 through q2+L) is/are output as the signal 132. Because the value(s) output as the signal 317 start from a lower-indexed element of the symbol buffer, the delay between receiving a signal sample and outputting the corresponding value of signal 317 is shorter than the delay between receiving a signal sample and outputting the corresponding value of the signal 132. Because the value(s) output as the signal 132 start from a higher-indexed element, however, it/they is/are likely to be less error-prone. These concepts are further illustrated with reference to in FIGS. 8C and 8D. In an example implementation, q2 is equal to q3.

FIG. 8C depicts contents of an example symbol buffer over a plurality of iterations of a sequence estimation process. In the example implementation shown in FIG. 8C, the symbol buffer 310 comprises four elements with the signal 317 corresponding to the contents of the first element (for simplicity of illustration, in FIGS. 8C and 8D, it is assumed only one element is output as signal 317 on each iteration) and the signal 132 corresponding to the fourth element (for simplicity of illustration, in FIGS. 8C and 8D, it is assumed only one element is output as signal 132 on each iteration). In the example implementation depicted, during each iteration of the sequence estimation process, candidates are generated by duplicating the survivors from the previous iteration, shifting the values by one element, and the appending a new value into the vacated element. Accordingly, ideally each survivor would differ from the previous survivor only in the lowest-indexed element (corresponding to the most-recent symbol). Where other elements of the most-recent survivor differ from corresponding elements of the previous survivor, such difference indicates that there is an error in those elements (either in the most-recent survivor or in the previous survivor). Given the convolutional nature of the partial response signal, symbols at higher indexes in the buffer are more reliable. Thus the symbol values will tend to converge as they move toward the right in FIG. 8C.

Figure 8D:
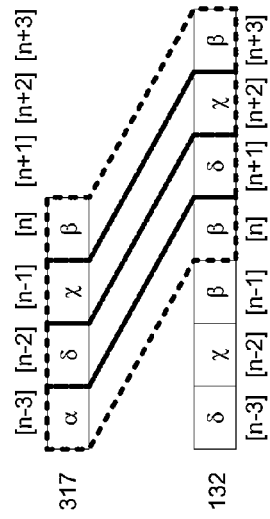
FIG. 8D depicts generated signals corresponding to the symbol buffer contents shown in FIG. 8C.

Shown are the contents of example symbol buffer 310 at times n−3, n−2, n−1, and n. At time n−3, a symbol survivor having values $\alpha,\beta,\chi,\delta$ is stored in the symbol buffer 310. Accordingly, as shown in FIG. 8D, the value of signal 317 at time n−3 is 'α' and the value of signal 132 is 'δ.' At time n−2, a new symbol survivor having values $\delta,\beta,\beta,\chi$ is stored in the symbol buffer 310. Accordingly, as shown in FIG. 8D, the value of signal 317 at time n−2 is 'δ' and the value of signal 132 is 'χ.' At time n−1, a new symbol survivor having values $\chi,\delta,\beta,\beta$ is stored in the symbol buffer 310. Accordingly, as shown in FIG. 8D, the value of signal 317 at time n−1 is 'x' and the value of signal 132 is 'β.' At time n, a new symbol survivor having values $\beta,\chi,\delta,\beta$ is stored in the symbol buffer 310. Accordingly, as shown in FIG. 8D, the value of signal 317 at time n is 'β' and the value of signal 132 is 'β.' Thus, in the example scenario depicted in FIG. 8C, the value in the first element of the symbol buffer 310 at time n−3 was erroneous and the symbol did not converge until it reached the second element (q=2) of the buffer 310. That is, at time n−2 the symbol changed from α to β and then remained β at times n−1 and n. This illustrates the consequence of taking signal 317 from the first element of the symbol buffer 310 and taking the signal 132 from the fourth element of the symbol buffer 312. Namely, the signal 317 has less delay than the signal 132 but is also more error prone than the signal 132.

In FIG. 8D, the values of the signals are shown for times n−3 to time n+3. The dashed lines illustrate the delay between the signal 317 and the signal 132.

Figure 9:
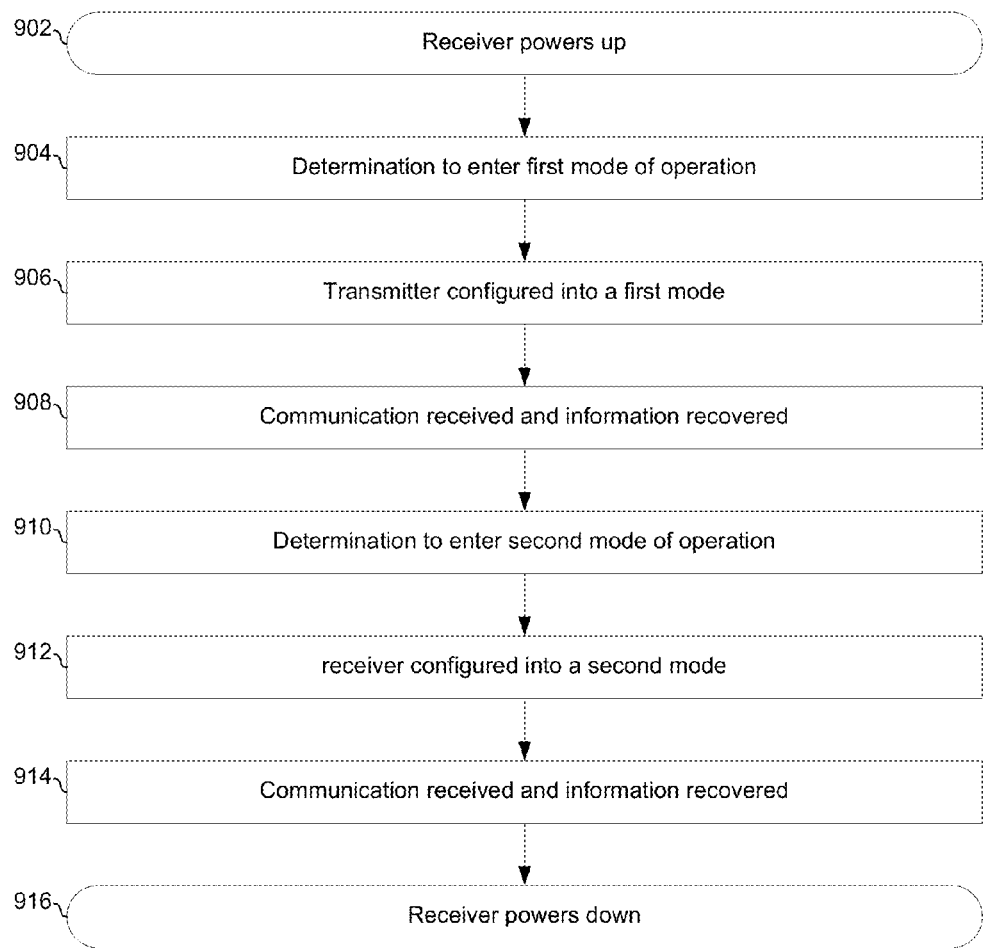
FIG. 9 is a flowchart illustrating dynamic configuration of a multi-mode receiver.

FIG. 9 is a flowchart illustrating dynamic configuration of a multi-mode receiver. In block 902, the receiver powers up. In block 904, the receiver determines to enter a first mode of operation. This determination may be made based on, for example, a user and/or application layer of the device in which the receiver resides indicating a need to communicate in accordance with the first mode of operation. This determination may additionally or alternatively be made based on, for example, the first mode being a default mode which the receiver may use to listen for availability/support (e.g., via broadcast beacons) of a second mode of operation by transmitters of other, in-range devices. This determination may additionally or alternatively be made based on, for example, measurements by the receiver (e.g., signal strength on particular frequency bands) and/or input from other sensors or receivers (e.g., Wi-Fi, Bluetooth, and/or GPS receivers).

In block 906, the receiver may be configured into the first mode and begin listening for communications. In an example implementation, a transmitter of the device in which the receiver resides may transmit (e.g., broadcast) the determined configuration of the receiver. In block 908, a signal may be received and processed by the receiver operating in the first mode to recover information contained in the received signal. The processing may include, for example, pulse shape filtering via a near-zero ISI (e.g., based on RRC) filter, equalization, symbol slicing according to a symbol constellation (e.g., QAM constellation), and FEC decoding.

In block 910, the receiver determines to enter a second mode of operation. This determination may be based, for example, on one or of the considerations described with respect to block 904. Additionally or alternatively, this determination may be based on the information recovered in block 910 (e.g., a control message instructing transition to the second mode). In block 912, the receiver may be configured into the second mode and begin listening for communications. In an example implementation, a transmitter of the device in which the receiver resides may transmit (e.g., broadcast) the determined configuration of the receiver. In block 914, a signal may be received and processed by the receiver operating in the second mode to recover information contained in the received signal. The processing may include, for example, pulse shape filtering via a filter that, combined with a pulse shaping filter of the transmitter from which the communication was receiver, achieves a desired total partial response, equalization, sequence estimation, and FEC decoding. In block 916, the receiver powers down.

FIG. 10 compares between Symbol Error Rate (SER) vs. SNR of the receiver configured into mode 1 of table 2 and configured into mode 2 of table 2. For purpose of FIG. 10, gross spectral efficiency has been set to 10 bits/sec/Hz. Line 1002 represents ideal performance of mode 1 (QAM1024 at $F_{b1}$) and line 1004 represents ideal performance of mode 2 (PR10, which uses a QAM32 constellation, at $2 \times F_{b1}$) without phase noise nor non-linear distortion. Line 1006 represents performance of mode 1, and line 1008 represents performance of mode 2 with SSB phase noise of −90 dBc/Hz at frequency offset of 100 KHz. The phase noise model has a fixed slope of −20 dB/dec. Line 1010 represents performance of mode 1, and Line 1012 represents performance of mode 2, under combined phase noise and non-linear distortion. The non-linear distortion model is saturated $3^{rd}$ order, without memory, where φ was selected to be 30° to create the polynomial saddle point, which is the clipping (saturation) point:

$$y = \begin{cases} x \cdot (1 - r \cdot e^{j\varphi} \cdot |x|^2), & x < x_{sat} \\ y_{sat}, & x \geq x_{sat} \end{cases}$$

$$y_{sat} = x_{sat} \cdot (1 - r \cdot e^{j\varphi} \cdot |x_{sat}|^2)$$

and r is set according to the desired distortion level (backoff).

In ideal conditions, mode 2 as shown performs 3.5 dB better than mode 1 as shown around SER of 3×10-2, which is a practical reference for BER of 10-6 with FEC rate around 0.95. Both mode 2 and mode 1 as shown are using symbols Pilot Over Head (POH) of 5%. Mode 2 as shown is estimating phase noise using the HPSE but the mode 1 shown is using perfect decisions for carrier recovery loop (for all other demodulating purposes it uses the symbol pilots and tentative decisions). The phase noise degrades the mode 1 by 1 dB but mode 2 by only 0.4 dB. The transmitted power of mode 2 shown is higher by 4.5 dB than for the mode 1 shown. Nevertheless, the combined phase noise and non-linear distortion degrades mode 1 shown by 2.2 dB while it affects mode 2 shown by only 0.6 dB. The overall SER improvement of mode 2 shown is around 5.3 dB but mode 2 shown has error correlation due to the nature of partial response (memory) hence, the FEC gain for mode 2 shown is 1 dB below the FEC gain of mode 1 shown. Therefore the practical sensitivity benefit is limited to 4.3 dB. Tx power benefit of mode 2 shown relative to mode 1 shown is 4.5 dB, thus the total contribution to the system gain by using mode 2 shown instead of mode 1 shown is 8.8 dB. But due to spectral mask limitations the Tx power must be below P1 dB-4.5 dB so that the spectral regrowth will not exceed the applicable spectral mask, therefore the practical benefit in Tx power of mode 2 shown vs. mode 1 shown is 3 dB and the overall system gain benefit of using mode 2 instead of mode 1 shown is 7.3 dB. With the use of crest factor reduction (CFR) and pre-distortion methods the Tx power for mode 2 shown may increase without violating the applicable spectral mask and the system gain benefit resulting from use of mode 2 shown instead of mode 1 shown may approach 8.8 dB.

In an example implementation, a receiver (e.g., the receiver of FIG. 1C) may be configurable to operate in at least two modes. While in a first modes, an input filter (e.g., 109) of the receiver may be configured as a near zero positive ISI filter (e.g., an RRC filter). While in a second mode, the input filter may be configured for reception of an inter-symbol correlated (ISC) signal. While the receiver is configured into in a second mode, the input filter may be configured based on a desired total partial response arising from a combination of the input filter and a pulse shaping filter (e.g., a filter implemented in ISC generation circuit 158) of a transmitter (e.g., transmitter of FIG. 1B) from which communications are to be received by the receiver. The second mode of the receiver may achieve a lower symbol error rate than the first mode for a given throughput and spectral efficiency. Which of the modes the receiver is configured into may be controlled based on feedback or request from a receiver and/or based on a measured performance indicator.

The receiver may comprise a gain circuit (e.g., implemented in front-end 108). While the receiver is configured into a first mode, the gain circuit may be configured to have a first amount of power back-off. While the receiver is configured into a second mode, the gain circuit may be configured to have a second amount of power back-off. While the receiver is configured into the second mode, the gain circuit may be dynamically configured based on noise figure of the receiver. The dynamic configuration of the gain circuit may dynamically vary a linearity of the receiver to optimize a noise figure in the receiver.

The receiver may comprise a symbol detection circuit (e.g., 178), wherein while the receiver is configured into a first mode, the symbol detection circuit may perform symbol slicing to determine the values of individual, uncorrelated (or assumed to be uncorrelated) symbols. While the receiver is configured into a second mode, the symbol detection circuit may perform sequence estimation to determine the values of sequences of correlated (or assumed to be correlated) symbols.

The receiver may comprise a forward error correction (FEC) decoding circuit (e.g., 176). While the receiver is configured into a first mode, the FEC decoding circuit may be configured for a first code rate and/or first FEC decoding algorithm. While the receiver is configured into a second mode, the FEC decoding circuit may be configured for a second code rate and/or second FEC decoding algorithm. While the receiver is configured into a second mode, the FEC decoding circuit may be configured for an iterative FEC decoding algorithm having a code structure that varies dynamically based on the statistical characteristics of errors in a detected signal generated by the receiver.

In an example implementation, a receiver may comprise a symbol detection circuit (e.g., 178) that is configurable to operate in at least two configurations, wherein a first configuration of the symbol detection circuit uses symbol slicing for symbol detection and a second configuration of the symbol detection circuit uses a sequence estimation algorithm for symbol detection. The first configuration of the symbol detection circuit and the second configuration of symbol detection circuit may each use an N-QAM (e.g., 32-QAM) symbol constellation for detecting symbols of a received signal. Each of the symbol detection circuit and the input filter circuit may be dynamically configured, based, for example, on a performance indicator during run-time of the receiver. The symbol detection circuit and the input filter circuit may be jointly configured such that the symbol detection circuit is in the first configuration when the input filter circuit is in the first configuration and the symbol detection circuit is in the second configuration when the input filter circuit is in the second configuration.

In an example implementation, a receiver may comprise an input filter circuit (e.g., 109) that is configurable to operate in at least two configurations, wherein a first configuration of the input filter circuit uses a first set of filter taps (i.e., first number of taps and/or first set of tap coefficients) and a second configuration of the input filter circuit uses a second set of filter taps (i.e., second number of taps and/or second set of tap coefficients). The first set of filter taps may be based on a root raised cosine (RRC) response. The second set of filter taps may be based on a partial response.

In an example implementation, a receiver may comprise a gain circuit (e.g., part of front-end 108) that is configurable to operate in at least two configurations, wherein a first configuration of the gain circuit corresponds to a first power back-off setting for the gain circuit, and a second configuration of the gain circuit corresponds to a second power back-off setting for the gain circuit. The non-linearity of the gain circuit may be dynamically varied based on a signal-to-noise ratio. The non-linearity of the gain circuit may be dynamically varied to optimize a noise figure in the receiver.

In an example implementation, a receiver may comprise a non-linear modeling circuit. The non-linear modeling circuit may be dynamically configured in response to dynamic varying of the non-linearity of the gain circuit.

The present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
an electronic receiver comprising a configuration control circuit, a non-linearity modeling circuit, and a symbol detection circuit, wherein:
when said electronic receiver is configured in a first mode of operation, said symbol detection circuit is configured to perform symbol-by-symbol slicing for detection of symbols that are assumed to be uncorrelated;
when said electronic receiver is configured in a second mode of operation, said symbol detection circuit is configured to perform sequence estimation for detection of sequences of symbols that are assumed to be correlated;
said configuration control circuit is operable to:
determine non-linear distortion present in a received signal; and
configure, during run-time of said electronic receiver, said electronic receiver between said first mode of operation and said second mode of operation based on said non-linear distortion present in said received signal
said non-linearity modeling circuit is operable to generate a model of said non-linear distortion present in said received signal.

2. The system of claim 1, wherein said non-linearity modeling circuit is operable to distort a signal using said model of said non-linear distortion present in said received signal.

3. The system of claim 1, wherein said non-linearity modeling circuit is dynamically configured during run-time of said electronic receiver.

4. The system of claim 1, wherein said electronic receiver is operable to output said non-linear distortion present in said received signal for transmission to a transmitter from which said received signal originated.

5. The system of claim 1, wherein:
said electronic receiver comprises a filter circuit; and
said configuration control circuit is operable to:
when said electronic receiver is in said first mode of operation, said filter circuit is configured as a near-zero inter-symbol interference filter; and
when said electronic receiver is in said second mode of operation, said filter circuit is configured as a partial-response filter.

6. The system of claim 1, wherein said symbol detection circuit operates at a first baud rate when said electronic receiver is configured in said first mode of operation and at a second baud rate when said electronic receiver is configured in said second mode of operation.

7. The system of claim 1, wherein:
said electronic receiver comprises a forward error correction (FEC) decoding circuit; and
said configuration control circuit is operable to:
while said electronic receiver is configured into said first mode of operation, configure said FEC decoding circuit for one or both of: a first code rate and a first FEC decoding algorithm; and
while said electronic receiver is configured into said second mode of operation, configure said FEC decoding circuit for one or both of: a second code rate and second FEC decoding algorithm.

8. The system of claim 1, wherein:
said electronic receiver comprises a forward error correction (FEC) decoding circuit; and
said configuration control circuit is operable to:
   while said electronic receiver is configured into said second mode of operation, configure said FEC decoding circuit for an iterative FEC decoding algorithm having a code structure that varies dynamically based on the statistical characteristics of errors in a detected signal generated by said receiver.

9. A method comprising:
in an electronic receiver that comprises a configuration control circuit, a non-linearity modeling circuit, and a symbol detection circuit:
   determining, by said configuration control circuit, non-linear distortion present in a received signal; and
   selecting, by said configuration control circuit based on said non-linear distortion, which of a first mode of operation of said electronic receiver and a second mode of operation of said electronic receiver, to use for processing said received signal, wherein:
      when said electronic receiver is configured in said first mode of operation, said symbol detection circuit is configured to perform symbol-by-symbol slicing for detection of symbols that are assumed to be uncorrelated;
      when said electronic receiver is configured in said second mode of operation, said symbol detection circuit is configured to perform sequence estimation for detection of sequences of symbols that are assumed to be correlated; and
   generating, by said non-linearity modeling circuit, a model of said non-linear distortion present in said received signal.

10. The system of claim 9, comprising distorting, by said non-linearity modeling circuit, a signal using said model of said non-linear distortion present in said received signal.

11. The system of claim 10, comprising dynamically configuring, during run-time of said electronic receiver, said non-linearity modeling circuit.

12. The system of claim 9, comprising outputting, by said electronic receiver, said non-linear distortion present in said received signal for transmission to a transmitter from which said received signal originated.

13. The system of claim 9, comprising:
when said electronic receiver is in said first mode of operation, configuring, by said configuration control circuit, a filter circuit of said electronic receiver as a near-zero inter-symbol interference filter; and
when said electronic receiver is in said second mode of operation, configuring, by said configuration control circuit, said filter circuit as a partial-response filter.

14. The system of claim 9, comprising operating said symbol detection circuit at a first baud rate when said electronic receiver is configured in said first mode of operation and a second baud rate when said electronic receiver is configured in said second mode of operation.

15. The system of claim 9, comprising:
while said electronic receiver is configured into said first mode of operation, configuring, by said configuration control circuit, one or both of: a FEC decoding circuit of said electronic receiver for a first code rate and a first FEC decoding algorithm; and
while said electronic receiver is configured into second mode of operation, configuring, by said configuration control circuit, one or both of: said FEC decoding circuit for a second code rate and second FEC decoding algorithm.

16. The system of claim 15, comprising:
while said electronic receiver is configured into said second mode of operation, configuring, by said configuration control circuit, a FEC decoding circuit for an iterative FEC decoding algorithm having a code structure that varies dynamically based on the statistical characteristics of errors in a detected signal generated by said electronic receiver.

17. A system comprising:
an electronic receiver comprising a configuration control circuit and a symbol detection circuit, wherein:
   when said electronic receiver is configured in a first mode of operation, said symbol detection circuit is configured to perform symbol-by-symbol slicing for detection of symbols that are assumed to be uncorrelated;
   when said electronic receiver is configured in a second mode of operation, said symbol detection circuit is configured to perform sequence estimation for detection of sequences of symbols that are assumed to be correlated;
   said configuration control circuit is operable to:
      determine non-linear distortion present in a received signal; and
      configure, during run-time of said electronic receiver, said electronic receiver between said first mode of operation and said second mode of operation based on said non-linear distortion present in said received signal; and
   said electronic receiver is operable to output said non-linear distortion present in said received signal for transmission to a transmitter from which said received signal originated.

18. The system of claim 17, wherein:
said electronic receiver comprises a filter circuit; and
said configuration control circuit is operable to:
   when said electronic receiver is in said first mode of operation, said filter circuit is configured as a near-zero inter-symbol interference filter; and
   when said electronic receiver is in said second mode of operation, said filter circuit is configured as a partial-response filter.

19. The system of claim 17, wherein said symbol detection circuit operates at a first baud rate when said electronic receiver is configured in said first mode of operation and at a second baud rate when said electronic receiver is configured in said second mode of operation.

20. The system of claim 17, wherein:
said electronic receiver comprises a forward error correction (FEC) decoding circuit; and
said configuration control circuit is operable to:
   while said electronic receiver is configured into said first mode of operation, configure said FEC decoding circuit for one or both of: a first code rate and a first FEC decoding algorithm; and
   while said electronic receiver is configured into said second mode of operation, configure said FEC decoding circuit for one or both of: a second code rate and second FEC decoding algorithm.

21. The system of claim 17, wherein:
said electronic receiver comprises a forward error correction (FEC) decoding circuit; and
said configuration control circuit is operable to:
  while said electronic receiver is configured into said second mode of operation, configure said FEC decoding circuit for an iterative FEC decoding algorithm having a code structure that varies dynamically based on the statistical characteristics of errors in a detected signal generated by said electronic receiver.

22. A system comprising:
an electronic receiver comprising a configuration control circuit and a symbol detection circuit, wherein:
  when said electronic receiver is configured in a first mode of operation, said symbol detection circuit is configured to perform symbol-by-symbol slicing for detection of symbols that are assumed to be uncorrelated;
  when said electronic receiver is configured in a second mode of operation, said symbol detection circuit is configured to perform sequence estimation for detection of sequences of symbols that are assumed to be correlated;
  said configuration control circuit is operable to:
    determine non-linear distortion present in a received signal; and
    configure, during run-time of said electronic receiver, said electronic receiver between said first mode of operation and said second mode of operation based on said non-linear distortion present in said received signal; and
  said symbol detection circuit operates at a first baud rate when said electronic receiver is configured in said first mode of operation and at a second baud rate when said electronic receiver is configured in said second mode of operation, wherein the first baud rate is different from the second baud rate.

23. The system of claim 22, wherein:
said electronic receiver comprises a filter circuit; and
said configuration control circuit is operable to:
  when said electronic receiver is in said first mode of operation, said filter circuit is configured as a near-zero inter-symbol interference filter; and
  when said electronic receiver is in said second mode of operation, said filter circuit is configured as a partial-response filter.

24. The system of claim 22, wherein:
said electronic receiver comprises a forward error correction (FEC) decoding circuit; and
said configuration control circuit is operable to:
  while said electronic receiver is configured into said first mode of operation, configure said FEC decoding circuit for one or both of: a first code rate and a first FEC decoding algorithm; and
  while said electronic receiver is configured into said second mode of operation, configure said FEC decoding circuit for one or both of: a second code rate and second FEC decoding algorithm.

25. The system of claim 22, wherein:
said electronic receiver comprises a forward error correction (FEC) decoding circuit; and
said configuration control circuit is operable to:
  while said electronic receiver is configured into said second mode of operation, configure said FEC decoding circuit for an iterative FEC decoding algorithm having a code structure that varies dynamically based on the statistical characteristics of errors in a detected signal generated by said electronic receiver.

* * * * *